United States Patent
Uto et al.

(10) Patent No.: US 9,452,590 B2
(45) Date of Patent: Sep. 27, 2016

(54) LAMINATE FILM AND AUTOMOTIVE WINDOW GLASS USING SAME

(75) Inventors: Takayuki Uto, Otsu (JP); Syunichi Osada, Otsu (JP); Wataru Gouda, Otsu (JP); Yuji Matsuo, Otsu (JP)

(73) Assignee: Toray Industries, Inc. (JP)

( * ) Notice: Subject to any disclaimer, the term of this patent is extended or adjusted under 35 U.S.C. 154(b) by 215 days.

(21) Appl. No.: 14/124,031

(22) PCT Filed: Jun. 22, 2012

(86) PCT No.: PCT/JP2012/065950
§ 371 (c)(1),
(2), (4) Date: Dec. 5, 2013

(87) PCT Pub. No.: WO2013/002130
PCT Pub. Date: Jan. 3, 2013

(65) Prior Publication Data
US 2014/0127485 A1 May 8, 2014

(30) Foreign Application Priority Data
Jun. 27, 2011 (JP) .................. 2011-141587

(51) Int. Cl.
*B32B 7/02* (2006.01)
*B32B 27/08* (2006.01)
(Continued)

(52) U.S. Cl.
CPC ............. *B32B 7/02* (2013.01); *B32B 27/08* (2013.01); *B32B 27/32* (2013.01); *B32B 27/36* (2013.01);
(Continued)

(58) Field of Classification Search
CPC ....... B32B 27/00; B32B 27/08; B32B 27/32; B32B 7/02; B32B 2250/05; B32B 2307/416; B32B 2307/42; B32B 2551/00; B32B 2605/08; B60J 3/007; Y10T 428/24942; G02B 5/0284; G02B 5/3066; G02B 5/00
See application file for complete search history.

(56) References Cited

U.S. PATENT DOCUMENTS 5,360,659 A * 11/1994 Arends ............. B32B 17/10018
359/359
7,520,608 B2 * 4/2009 Ishak ................... G02C 7/104
351/159.65

(Continued)

FOREIGN PATENT DOCUMENTS

JP 2002-509271 3/2002
JP 2003-515754 5/2003
(Continued)

OTHER PUBLICATIONS

Oxonol Melting Point.*
(Continued)

*Primary Examiner* — Maria Veronica Ewald
*Assistant Examiner* — Travis Figg
(74) *Attorney, Agent, or Firm* — DLA Piper LLP (US)

(57) ABSTRACT

A multilayer film includes 50 or more layers of each of two or more thermoplastic resins having different optical properties are alternately laminated with each other, wherein the average reflectance in a wavelength range of 900 to 1,200 nm is 70% or higher; both of the differences between the a* values (Δa*) and between the b* values (Δb*), respectively, of transmitted light incoming at an angle of 12° and of transmitted light incoming at an angle of 45° are 10 or less; and the multilayer film comprises a bandwidth of not less than 50 nm where the transmittance is 80% or lower in a wavelength range of 400 to 800 nm.

18 Claims, 2 Drawing Sheets

(51) Int. Cl.
*B60J 3/00* (2006.01)
*B32B 27/32* (2006.01)
*B32B 27/36* (2006.01)

(52) U.S. Cl.
CPC ............ *B60J 3/007* (2013.01); *B32B 2250/05* (2013.01); *B32B 2250/42* (2013.01); *B32B 2307/306* (2013.01); *B32B 2307/412* (2013.01); *B32B 2307/416* (2013.01); *B32B 2307/42* (2013.01); *B32B 2307/734* (2013.01); *B32B 2605/006* (2013.01); *B32B 2605/08* (2013.01); *Y10T 428/24942* (2015.01)

(56) References Cited

U.S. PATENT DOCUMENTS

| | | | | |
|---|---|---|---|---|
| 2006/0286381 | A1* | 12/2006 | Naito | G02B 1/11 428/411.1 |
| 2007/0128419 | A1* | 6/2007 | Osada | B32B 7/02 428/216 |
| 2007/0195412 | A1* | 8/2007 | Oya | B32B 7/02 359/487.05 |
| 2007/0224434 | A1* | 9/2007 | Osada | B32B 27/08 428/480 |
| 2007/0273964 | A1 | 11/2007 | Oya | |

FOREIGN PATENT DOCUMENTS

| | | |
|---|---|---|
| JP | 3901911 | 1/2007 |
| JP | 2007-176154 | 7/2007 |
| JP | 2007-307893 | 11/2007 |
| JP | 2008-200924 | 9/2008 |
| JP | 2008200924 A * | 9/2008 |
| JP | 4310312 | 5/2009 |
| JP | 2010-017854 | 1/2010 |
| WO | 99/36258 | 7/1999 |
| WO | 01/38907 | 5/2001 |
| WO | 2005/040868 | 5/2005 |
| WO | 2005/095097 | 10/2005 |

OTHER PUBLICATIONS

Supplemental European Search Report issued Jan. 5, 2015 from corresponding European Application No. 12804037.5.

* cited by examiner

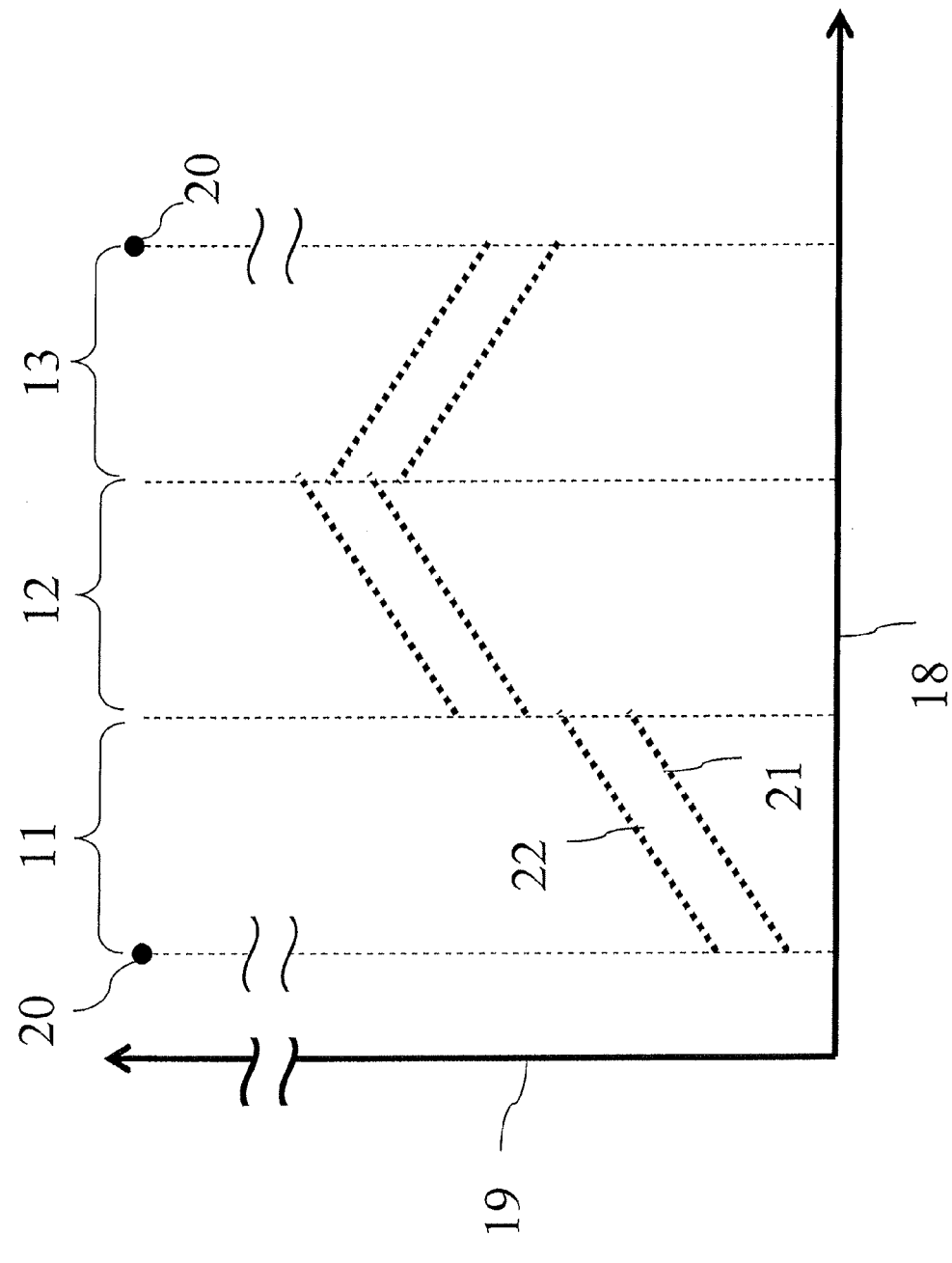

LAMINATE FILM AND AUTOMOTIVE WINDOW GLASS USING SAME

TECHNICAL FIELD

This disclosure relates to a multilayer film, particularly a multilayer film which can be suitably used in window glasses of automobiles, trains and buildings.

BACKGROUND

In recent years, in response to introduction of carbon dioxide emission control for environmental protection, heat ray-shielding glasses that are capable of suppressing the inflow of heat from outside, particularly sunlight, during summertime have been drawing attention as window glasses of vehicles such as automobiles and trains and those of buildings.

As one example of such heat ray-shielding glasses, one in which a heat ray-absorbing material is incorporated into a glass or an interlayer used in a laminated glass is known (for example, Japanese Patent Application Laid-Open Publication (JP-A) No. 2010-17854). However, since such a heat ray-absorbing material converts the sunlight incoming from outside into thermal energy, there is a problem that the thus generated heat radiates into the room and the heat ray-shielding efficiency is consequently reduced. In addition, absorption of heat radiation partially increases the glass temperature and the resulting difference between the glass temperature and the ambient temperature may cause damage to the glass itself.

Meanwhile, there are also known heat ray-reflecting glasses in which a heat ray-reflecting film is formed on a glass or a film having a heat ray-reflecting function is inserted into a laminated glass. In these heat ray-reflecting glasses, incoming lights including infrared radiation are reflected to the outside. Therefore, lights and heat do not flow into the room and heat rays can thus be more effectively blocked. In addition, since an increase in the glass temperature caused by heat rays can be suppressed, damage to the glasses can be inhibited as well.

Representative examples of a method for obtaining such a heat ray-reflecting glass include a method in which a metal film is formed on a glass surface by sputtering or the like (for example, Japanese Patent No. 3901911). However, although a metal film reflects heat rays, it also unevenly reflects visible light and the reflection intensity varies depending on the wavelength; therefore, there is a problem that the resulting glass shows coloration. In addition, since a metal film cannot selectively reflect a light of visible wavelength region and a light of near-infrared region, it is difficult to improve the heat ray-shielding performance of a glass while maintaining its visible light transmittance. Moreover, since a metal film has a radio wave-blocking property, it may make an instrument such as a cellular phone unusable.

Furthermore, as other example of heat ray-reflecting glass, laminated glasses into which a polymer multilayer film prepared by alternately laminating polymers having different refractive indices is inserted are known (for example, Japanese Patent No. 4310312). In such a polymer multilayer film, the wavelengths to be reflected can be selectively chosen by controlling the layer thickness; therefore, the film can be made to selectively reflect the lights of near-infrared range, so that the heat ray-shielding performance of a glass can be improved while maintaining its visible light transmittance. In addition, since such a polymer multilayer film does not contain any radio wave-blocking material such as a metal, excellent radio wave permeability can be retained. However, in cases where such a multilayer laminate film is used, as the light incident angle with respect to the film surface increases, the wavelengths of lights that can be reflected shift toward the lower wavelength side and this results in a change in the color tone. Accordingly, to obtain a heat ray-reflecting glass showing no color change, since the light reflection bandwidth viewed from the front side is required to be arranged in the near-infrared region which is further away from the visible wavelength region, there is a problem that the heat ray-shielding performance cannot be improved. Furthermore, in the near-infrared region where such a multilayer laminate film can mainly reflect lights, only a small fraction of sunlight can be reflected; therefore, such heat ray-shielding performance cannot necessarily be considered sufficient.

It could therefore be helpful to provide a multilayer film having superior heat-ray shielding performance as compared to conventional polymer multilayer films, in which multilayer film the changes in color caused by different viewing angles are suppressed.

SUMMARY

We thus provide a multilayer film comprising a constitution in which 50 or more layers of each of two or more thermoplastic resins having different optical properties are alternately laminated with each other, wherein the average reflectance in a wavelength range of 900 to 1,200 nm is 70% or higher; both of the differences between the $a^*$ values ($\Delta a^*$) and between the $b^*$ values ($\Delta b^*$), respectively, of the transmitted light of white light incoming at an incident angle of 12° and of the transmitted light of white light incoming at an incident angle of 45° are 10 or less; and the multilayer film comprises a bandwidth of not less than 50 nm where the transmittance is 80% or lower in a wavelength range of 400 to 800 nm.

Since changes in color caused by different viewing angles are reduced even when a reflection bandwidth is arranged in the lower wavelength side than in conventional multilayer films, a multilayer film which has excellent visibility and shows superior heat ray-shielding performance as compared to conventional polymer multilayer films can be obtained. Further, when the multilayer film is used in a window of an automobile, train or a building, an increase in the interior temperature caused by sunlight can be suppressed.

BRIEF DESCRIPTION OF THE DRAWINGS

FIG. 1(a) is a schematic front view of an apparatus and FIGS. 1(b), (c) and (d) are cross-sectional views of resin flow paths along the plane L-L', M-M' and N-N', respectively.

FIG. 2 is a diagram showing one example of the relationship between the order of layers and the layer thickness (layer thickness distribution) in the multilayer film which is also an example of a multilayer film comprising three inclined structures based on the λ/4 design concept.

DESCRIPTION OF SYMBOLS

Figure 1:
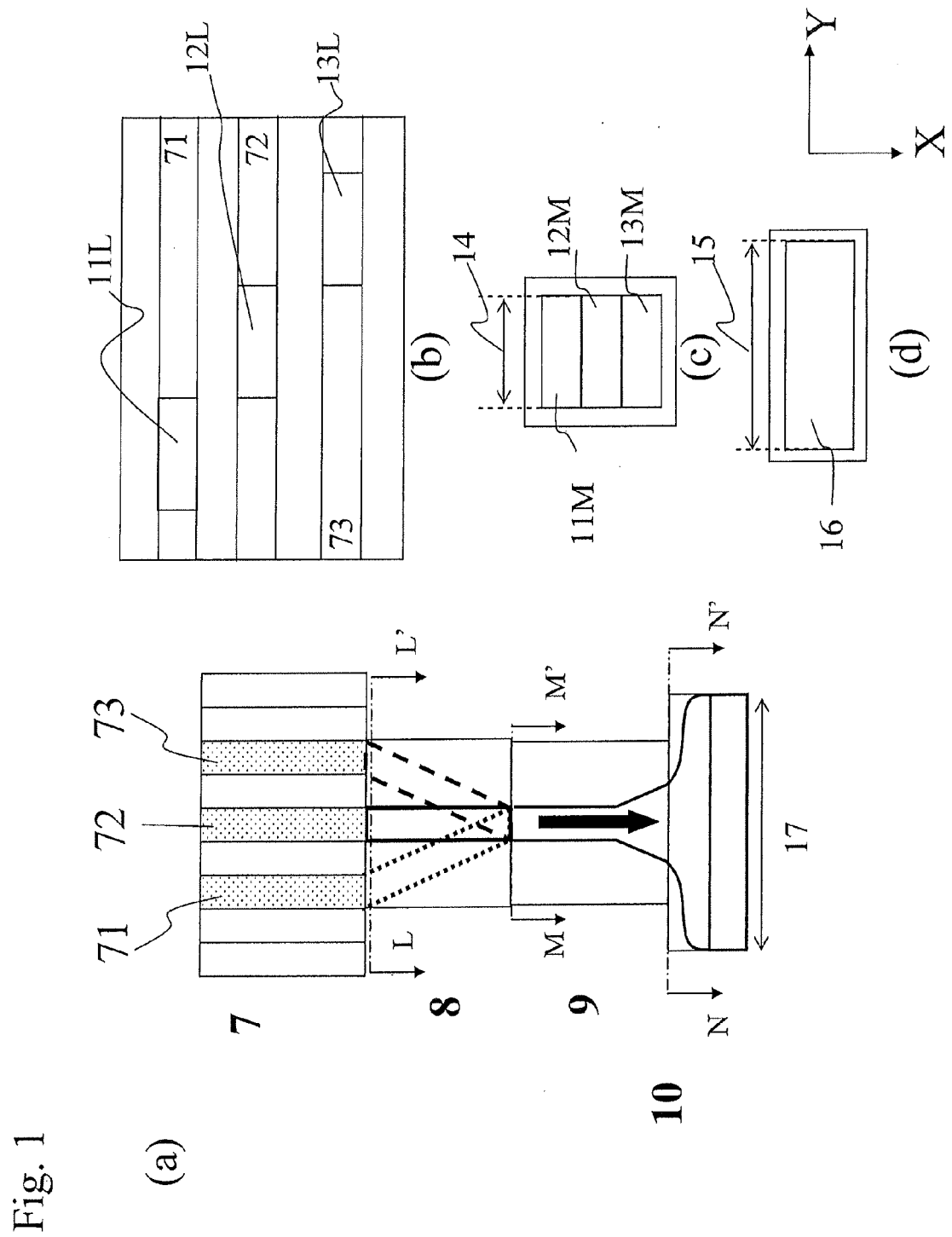
FIGS. 1(a) to (d) are drawings that illustrate one exemplary method of producing the multilayer film.

7: multi-layer laminating apparatus
71: slit plate
72: slit plate
73: slit plate
8: converging device 9: connecting pipe
10: die
11: inclined structure having a layer thickness formed by slid plate 71
12: inclined structure having a layer thickness formed by slid plate 72
13: inclined structure having a layer thickness formed by slid plate 73
11L: resin flow path from the outlet port of slit plate 71
12L: resin flow path from the outlet port of slit plate 72
13L: resin flow path from the outlet port of slit plate 73
11M: resin flow path connected to the outlet port of slit 71 and configured by converging device
12M: resin flow path connected to the outlet port of slit 72 and configured by converging device
13M: resin flow path connected to the outlet port of slit 73 and configured by converging device
14: length of resin flow path in the transverse direction
15: length of die in the film transverse direction at the inlet port
16: cross-section of flow path at the inlet port of die
17: length of die lip in the film transverse direction
18: order of layers
19: layer thickness
20: point showing the thickness of thick-film layer
21: layer thickness distribution of thermoplastic resin A
22: layer thickness distribution of thermoplastic resin B

DETAILED DESCRIPTION

Our films and methods will now be described in detail referring to the drawings. However, this disclosure should not be interpreted in any restrictive way to the following modes and examples thereof. It is needless to say that various modifications may also be made without departing from the spirit of the disclosure.

The multilayer film is required to be composed of thermoplastic resins. Generally speaking, thermoplastic resins are less expensive than thermosetting resins and photo-curing resins and can be simply and continuously made into a sheet by a known melt-extrusion method. Therefore, a multilayer film can be obtained at a low cost.

In the multilayer film, it is required that 50 or more layers of each of two or more thermoplastic resins having different optical properties be alternately laminated with each other. The term "different optical properties" used herein means that the refractive indices of the thermoplastic resins are different by 0.01 or more in any one of two perpendicular directions that are arbitrarily selected in the film plane and the direction perpendicular to the film plane. Further, the term "alternately laminated" used herein means that layers composed of different resins are laminated in a regular sequence in the thickness direction and, for example, in cases where a multilayer film is composed of two thermoplastic resins A and B that have different optical properties, the respective layers expressed as "layer A" and "layer B" are laminated in the form of A(BA)n (wherein, n is a natural number). By alternately laminating resins having different optical properties in this manner, it is possible to allow the resulting multilayer film to exhibit interference reflection by which a light having a wavelength designed based on the relationship between the difference in the refractive indices of the respective layers and the thickness of the layers can be reflected. Further, in cases where the number of laminated layers is less than 50 for each thermoplastic resin, a high reflectance cannot be attained over a sufficiently wide bandwidth in the infrared region, so that satisfactory heat ray-shielding performance cannot be attained. Moreover, with regard to the above-described interference reflection, the greater the number of layers, the wider the wavelength bandwidth of light becomes for which a high reflectance can be achieved. Hence, the superior reflectance increases the heat ray-shielding performance of the resulting multilayer film. Furthermore, although there is no upper limit on the number of layers, an increase in the number of layers leads to an increase in the production cost in association with upscaling of the production apparatuses, and an increase in the film thickness deteriorates the ease of handling. In particular, an increase in the film thickness may cause a defect in the step of producing a laminated glass; therefore, realistically, the upper limit of the number of layers is practically 10,000 or so.

Examples of thermoplastic resin include linear polyolefins such as polyethylene, polypropylene, poly(4-methylpentene-1) and polyacetal; alicyclic polyolefins that are obtained by ring-opening metathesis polymerization or addition polymerization of norbornenes or addition-copolymerization with other olefins; biodegradable polymers such as polylactic acid and polybutyl succinate; polyamides such as nylon 6, nylon 11, nylon 12 and nylon 66; aramids; polyesters such as polymethyl methacrylate, polyvinyl chloride, polyvinylidene chloride, polyvinyl alcohol, polyvinyl butyral, ethylene-vinyl acetate copolymer, polyacetal, polyglycolic acid, polystyrene, styrene-copolymerized polymethyl methacrylate, polycarbonate, polypropylene terephthalate, polyethylene terephthalate, polybutylene terephthalate and polyethylene-2,6-naphthalate; polyether sulfones; polyether ether ketones; modified polyphenylene ethers; polyphenylene sulfides; polyetherimides; polyimides; polyallylates; tetrafluoroethylene resins; trifluoroethylene resins; trifluorochloroethylene resins; tetrafluoroethylene-hexafluoropropylene copolymers; and polyvinylidene fluorides. Thereamong, from the standpoints of strength, heat resistance, transparency and versatility, it is particularly preferred to use a polyester. These thermoplastic resins may be in the form of a copolymer or a mixture of two or more resins.

As the polyester, a polyester obtained by polymerization of monomers that contain an aromatic dicarboxylic acid or an aliphatic dicarboxylic acid and a diol as main constituents is preferred. Examples of the aromatic dicarboxylic acid include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylether dicarboxylic acid and 4,4'-diphenylsulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Among these dicarboxylic acids, terephthalic acid and 2,6-naphthalene dicarboxylic acid are preferred since they exhibit a high refractive index. These acid components may be used individually, or two or more thereof may be used in combination. Moreover, these acid components may also be partially copolymerized with an oxy acid such as hydroxybenzoic acid.

Further, examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexane dimethanol, 1,3-cyclohexane dimethanol, 1,4-cyclohexane dimethanol, diethylene glycol, triethylene glycol, polyalkylene glycol, 2,2-bis(4-hydroxyethoxyphenyl)propane, isosorbate and spiroglycol. Thereamong, ethylene glycol is preferably used. These diol components may be used individually, or two or more thereof may be used in combination.

As the thermoplastic resins, among the above-described polyesters, it is preferred to use, for example, polyethylene terephthalate and a polymer thereof, polybutylene terephthalate and a copolymer thereof, polybutylene naphthalate and a copolymer thereof, polyhexamethylene terephthalate and a copolymer thereof, or polyhexamethylene naphthalate and a copolymer thereof.

In the multilayer film, the difference in the in-plane average refractive indices between the layers that are composed of at least two thermoplastic resins having different optical properties is preferably 0.03 or greater, more preferably 0.05 or greater, still more preferably 0.1 or greater. When the difference in the in-plane average refractive index is smaller than 0.03, an adequate reflectance cannot be attained, so that satisfactory heat ray-shielding performance may be attained. To achieve the above-described difference in the in-plane refractive index, at least one thermoplastic resin must be crystalline and at least one thermoplastic resin must be non-crystalline. In this case, the difference in the refractive index can be provided in the stretching and heat treatment steps of the film production.

As for a preferred combination of the thermoplastic resins having different optical properties to be used in the multilayer film, it is primarily preferred that the absolute value of the difference in the SP values of the thermoplastic resins be 1.0 or smaller. When the absolute value of the difference in the SP values is 1.0 or smaller, interlayer delamination is not likely to occur. It is more preferred that the polymers having different optical properties be a combination of polymers having the same basic skeleton. The term "basic skeleton" used herein refers to a repeating unit constituting a resin. For example, in cases where polyethylene terephthalate is used as one of the thermoplastic resins, from the standpoint of easily achieving a highly precise laminate structure, it is preferred that ethylene terephthalate having the same basic skeleton as that of polyethylene terephthalate be incorporated. When the thermoplastic resins having different optical properties have the same basic skeleton, a high lamination accuracy is attained and interlayer delamination at the laminate interface is not likely to occur.

Further, in a preferred combination of the thermoplastic resins having different optical properties to be used in the multilayer film, the difference in the glass transition temperatures of the thermoplastic resins is 20° C. or less. When the difference in the glass transition temperatures is larger than 20° C., the thickness uniformity becomes poor when forming a multilayer film, resulting in a defective outer appearance of metallic luster. In addition, in molding of the multilayer film, problems such as overstretching may likely to occur. Furthermore, in the two thermoplastic resins having different optical properties, it is also preferred that the glass transition temperature of the crystalline resin be lower than that of the noncrystalline resin. In this case, when the multilayer film is stretched at an appropriate temperature so as to orient and crystallize the crystalline resin, orientation of the noncrystalline resin can be more inhibited as compared to crystalline resin, so that a difference in the refractive index can be set easily.

As one example of the combination of resins for satisfying the above-described conditions, in the multilayer film, it is preferred that at least one thermoplastic resin contain polyethylene terephthalate or polyethylene naphthalate and at least one other thermoplastic resin be a polyester containing a polyester derived from spiroglycol. The term "polyester derived from spiroglycol" refers to a polyester obtained by using spiroglycol as a diol component, which is a copolymer of spiroglycol and other ester structural unit; a polyester in which spiroglycol is used as a sole diol component; or a polyester obtained by blending these polyesters with other polyester resin, in which spiroglycol residues preferably account for more than half of all diol residues. A polyester derived from spiroglycol is preferred because, since the difference between the glass transition temperature thereof and that of polyethylene terephthalate or polyethylene naphthalate is small, the resulting multilayer film is not likely to be overstretched at the time of molding and interlayer delamination is not likely to occur. It is more preferred that at least one thermoplastic resin contain polyethylene terephthalate or polyethylene naphthalate and at least one other thermoplastic resin be a polyester obtained by using spiroglycol and cyclohexanedicarboxylic acid. When a polyester obtained by using spiroglycol and cyclohexanedicarboxylic acid is employed, since the difference between its in-plane refractive index and that of polyethylene terephthalate or polyethylene naphthalate is large, the resulting multilayer film is likely to attain a high reflectance. Furthermore, since the difference between the glass transition temperature of a polyester obtained by using spiroglycol and cyclohexanedicarboxylic acid and that of polyethylene terephthalate or polyethylene naphthalate is small and such a polyester has excellent adhesiveness, the resulting multilayer film is not likely to be overstretched at the time of molding and interlayer delamination is not likely to occur.

Further, in the multilayer film, it is also preferred that at least one thermoplastic resin contain polyethylene terephthalate or polyethylene naphthalate and at least one other thermoplastic resin be a polyester derived from cyclohexane dimethanol. The term "polyester derived from cyclohexane dimethanol" refers to a polyester obtained by using cyclohexane dimethanol as a diol component, which is a copolymer of cyclohexane dimethanol and other ester structural unit; a polyester in which cyclohexane dimethanol is used as a sole diol component; or a polyester obtained by blending these polyesters with other polyester resin, in which cyclohexane dimethanol residues preferably account for more than half of all diol residues. Such a polyester derived from cyclohexane dimethanol is preferred because, since the difference between the glass transition temperature thereof and that of polyethylene terephthalate or polyethylene naphthalate is small, the resulting multilayer film is not likely to be overstretched at the time of molding and interlayer delamination is not likely to occur. It is more preferred that at least one thermoplastic resin be an ethylene terephthalate polycondensate in which the amount of copolymerized cyclohexane dimethanol is 15% by mol to 60% by mol. In this case, while a high reflective performance is maintained, changes in the optical properties caused by heat and time in particular are reduced and interlayer delamination is made unlikely to occur. An ethylene terephthalate polycondensate in which the amount of copolymerized cyclohexane dimethanol is 15% by mol to 60% by mol adheres very strongly with polyethylene terephthalate. Further, its cyclohexane dimethanol group assumes a cis or trans configuration as a geometrical isomer and a chair or boat form as a conformational isomer. Therefore, it is not likely to undergo oriented crystallization even when co-stretched with polyethylene terephthalate. Furthermore, such an ethylene terephthalate polycondensate has a high reflectance and not only changes in its optical properties caused by thermal history are further reduced, but also breakage during film formation is not likely to occur.

In the multilayer film, it is required that the average reflectance in a wavelength range of 900 to 1,200 nm is 70% or higher. The term "reflectance" used herein is defined as the reflectance of white light incoming at an incident angle of 12°. The term "white light" refers to a light which, as in the case of sunlight and halogen lamp, shows a continuous intensity distribution over a wide range of the visible wavelength region and can thus be perceived as achromatic color. Further, it is defined that the C*, a* and b* values are all values that are determined using a light emitted from a halogen lamp (tungsten). Sunlight has its intensity distribution primarily in the visible wavelength region and the intensity distribution tends to become smaller as the wavelength becomes longer. Meanwhile, in those applications where transparency is demanded, the heat ray-shielding performance can be improved by blocking lights of the visible wavelength region. However, since this also reduces the transparency, the resulting multilayer film may often be unsuitable for use. In view of this, the heat ray-shielding performance can be effectively improved by increasing the average reflectance in a wavelength range of 900 to 1,200 nm (about 18% of the total intensity of sunlight), which is slightly larger than the visible wavelength region. When the average reflectance in a wavelength range of 900 to 1,200 nm is lower than 70%, since sufficient heat ray-shielding performance is not attained, it is difficult to expand the use of the multilayer film to those applications where high heat ray-shielding performance is required. The average reflectance in a wavelength range of 900 to 1,200 nm is preferably 80% or higher, more preferably 90% or higher. As the average reflectance in a wavelength range of 900 to 1,200 nm increases, superior heat ray-shielding performance can be provided. A multilayer film having an average reflectance of 70% or higher in a wavelength range of 900 to 1,200 nm can be obtained by increasing the number of layers contained in the multilayer film or by increasing the difference in the refractive index between the thermoplastic resins that are alternately laminated. Although the preferred number of layers is variable depending on the difference in the refractive index between the thermoplastic resins that are alternately laminated, for example, the total number of layers of the above-described two or more thermoplastic resins is preferably not less than 200. By this, the average reflectance in a wavelength range of 900 to 1,200 nm can be easily controlled to be 70% or higher. Further, when controlling the average reflectance in a wavelength range of 900 to 1,200 nm to be 80% or higher, the total number of layers is preferably not less than 400 and, when controlling the average reflectance in a wavelength range of 900 to 1,200 nm to be 90% or higher, the total number of layers is preferably not less than 500.

To obtain such a multilayer film, it is preferred that the sum of the optical thicknesses of adjacent layers be 400 to 650 nm for more than of layers. The term "optical thickness" (μm) used herein refers to a product of the thickness (μm) of each layer and the refractive index (–) of the resin constituting the layer, and the sum of the optical thicknesses of adjacent layers serves as a factor for determining the wavelength at which interference reflection occurs in the multilayer film. Since interference reflection caused by such adjacent layers having a sum of optical thicknesses of 400 to 650 nm occurs in a wavelength range of about 800 to 1,300 nm, the average reflectance in a wavelength range of 900 to 1,200 nm can be easily controlled to be not less than 70%. Further, the reflectance of a multilayer film increases as the number of layers or the difference in the refractive index between adjacent layers becomes large; therefore, in the multilayer film in which the sum of the optical thicknesses of adjacent layers is 400 to 650 nm for more than of its layers, it is easy to effectively improve the reflectance in a wavelength range of 900 to 1,200 nm.

For example, in cases where polyethylene terephthalate (refractive index=1.66) is used as the thermoplastic resin A and polyethylene terephthalate (refractive index=1.55) copolymerized with spiroglycol and cyclohexanedicarboxylic acid is used as the thermoplastic resin B, to control the average reflectance in a wavelength range of 900 to 1,200 nm to be not less than 70%, it is required that the number of layers whose sum of the optical thicknesses of adjacent layers is 400 to 650 nm be not less than about 200. Further, in that case, the thickness of each layer is of about 120 to 220 nm.

The larger becomes the difference in the refractive index between the resins, the smaller becomes the number of layers required for controlling the average reflectance in a wavelength range of 900 to 1,200 nm to be not less than 70%. If the difference in the refractive index is 0.3 or larger, a sufficient reflectance can be attained even when the number of layers is 50 or so.

In the multilayer film, it is required that both of the differences between the a* values (Δa*) and between the b* values (Δb*), respectively, of the transmitted light of white light incoming at an incident angle of 12° and of the transmitted light of white light incoming at an incident angle of 45° be 10 or less. As described in the above, in a multilayer film obtained by alternately laminating resins having different refractive indices based on the principle of interference reflection as in the present invention, the reflection bandwidth shifts and the color tone varies depending on the film thickness and incident angle of light. Therefore, this pose a problem for a window glass which must be able to be seen in a stable color tone from various angles; however, when both of the differences between the a* values (Δa*) and between the b* values (Δb*), respectively, of the transmitted light of white light incoming at an incident angle of 12° and of the transmitted light of white light incoming at an incident angle of 45° are 10 or less, a stable color tone can be exhibited regardless of a slight variation in the film thickness and incident angle of light, so that the resulting multilayer film can be suitably used in a window glass. More preferably, the Δa* and the Δb* are both 5 or less. In this manner, the smaller the differences in the a* value (Δa*) and the b* value (Δb*) become, the more suppressed is a change in the color tone caused by different viewing angles. Therefore, a film more suitable for a window glass is obtained. Further, it is also preferred that both of the differences between the a* values (Δa*) and between the b* values (Δb*), respectively, of the transmitted light of white light incoming at an incident angle of 12° and of the transmitted light of white light incoming at an incident angle of 60° be 10 or less. Moreover, it is also preferred that both of the differences between the a* values (Δa*) and between the b* values (Δb*), respectively, of the transmitted light of white light incoming at an incident angle of 12° and of the transmitted light of white light incoming at an incident angle of 75° be 10 or less. In this case, since a change in the color tone is inhibited even when the film surface is viewed at a large angle, the film can be more suitably used. Such a film can be achieved by, for example, providing an absorption bandwidth in a specific wavelength range in the visible wavelength region as described below; allowing a film to have uniform light reflectance in the entire visible wavelength region; or imparting a film with reflective property in a part of the visible wavelength region.

It is required that the multilayer film comprise a bandwidth of not less than 50 nm where the transmittance is 80% or lower in a wavelength range of 400 to 800 nm. The term "transmittance" is defined as linear transmittance of white light incoming at an incident angle of 12°. As described in the above, in a multilayer film obtained by alternately laminating resins having different refractive indices based on the principle of interference reflection as in the present invention, the reflection bandwidth shifts and the color tone vary depending on the film thickness and incident angle of light. Therefore, in the case of a multilayer film which does not show interference reflection in a wavelength range of 900 to 1,200 nm, reflection occurs in the visible wavelength region due to primary or higher-order interference reflection and a change in the color tone occurs due to a shift in the bandwidth depending on the angle to the film surface, posing an impediment to the improvement of the heat ray-shielding performance. However, by controlling the transmittance with the use of a colored component or the like in the region where the bandwidth varies depending on the angle to the film surface, a film which shows a stable color tone regardless of a change in the angle of reflected light can be obtained and both of the differences between the a* values (Δa*) and between the b* values (Δb*), respectively, of the transmitted light of white light incoming at an incident angle of 12° and of the transmitted light of white light incoming at an incident angle of 45° can be easily controlled at 10 or less. The transmittance at a wavelength of 400 to 800 nm is preferably 50% or lower, more preferably 30% or lower, and it is still more preferred that light absorption have greater contribution as a transmittance-reducing factor than light reflection. In this case, a high effect of inhibiting a change in the color tone can be attained. Further, sunlight has a large intensity distribution particularly in the visible wavelength region of 400 to 800 nm and this accounts for about 54% of the total sunlight intensity. Therefore, by reducing the transmittance in a part of wavelength range of 400 to 800 nm, an effect of improving the heat ray-shielding performance can be attained as well. When the transmittance is reduced by light absorption, the heat-shielding efficiency is slightly lowered because the absorbed light is partially converted to heat to cause influx of heat, while when the transmittance is reduced by light reflection, light is not converted to heat and the heat-shielding efficiency can be improved. The lower limit of the transmittance is not particularly restricted; however, depending on the bandwidth, a reduction in the transmittance may also lead to a reduction in the visible light transmittance and sufficient transparency may thus not be provided for an application where transparency is demanded, such as a window glass of a vehicle or building. Therefore, the lower limit of the transmittance is determined taking into consideration the relation with the bandwidth.

It is particularly preferred that the multilayer film comprise a bandwidth of not less than 50 nm where the transmittance is 80% or lower in a wavelength range of 600 to 800 nm. As described in the above, even when an interference reflection bandwidth provided in the near-infrared region shifts to the visible wavelength region (particularly a wavelength range of 600 to 800 nm) due to a low-wavelength shift caused by a large viewing angle with respect to the film surface, by incorporating a bandwidth of not less than 50 nm where the transmittance is 80% or lower in a wavelength range of 600 to 800 nm, the effect on the color tone imposed by the shifted interference reflection can be suppressed, so that both of the differences between the a* values (Δa*) and between the b* values (Δb*), respectively, of the transmitted light of white light incoming at an incident angle of 12° and of the transmitted light of white light incoming at an incident angle of 45° can be easily controlled to be 10 or less. In addition, since the wavelength range of 600 to 800 nm accounts for 18% of the intensity distribution of visible light in the visible wavelength region and this is extremely small as compared to the wavelength range of 500 to 600 nm which accounts for 76% of the intensity distribution of visible light, even when the transmittance in a wavelength range of 600 to 800 nm is reduced, a reduction in the visible light transmittance remains small. Moreover, since an improvement in the heat ray-shielding performance has a greater effect on a reduction of transmittance in the visible light region than in the near-infrared region, by further controlling only the transmittance in a wavelength range of 600 to 800 nm to suppress the visible light transmittance by 1%, the solar transmittance can be reduced by 1.3%. Therefore, as compared to a reduction of 0.2% in the solar transmittance, which attained by controlling only the transmittance in a wavelength range of 500 to 600 nm and suppressing the visible transmittance by 1%, an effect of efficiently improving the heat ray-shielding performance without reducing the transparency can also be attained by controlling only the transmittance in a wavelength range of 600 to 800 nm. Preferably, light absorption has greater contribution as a transmittance-reducing factor than light reflection. More preferably, the multilayer film comprises a bandwidth of not less than 50 nm where the transmittance is 50% or lower in a wavelength range of 600 to 800 nm. It is still more preferred that the multilayer film comprise a bandwidth of not less than 50 nm where the transmittance is 30% or lower in a wavelength range of 600 to 800 nm. By reducing the transmittance in this wavelength range, even when an interference reflection bandwidth provided in the near-infrared region undergoes a low-wavelength shift depending on the viewing angle with respect to the film surface, the change in the transmittance can be kept small and changes in the color tone can be almost completely suppressed. In addition, the resulting multilayer film can also be imparted with heat ray-shielding performance. It is also preferred that width of the bandwidth where the transmittance is 80% or lower in a wavelength range of 600 to 800 nm be not less than 100 nm, and it is more preferred that the transmittance be 80% or lower in a 150-nm bandwidth within a wavelength range of 650 to 800 nm. In this manner, by increasing the width of the bandwidth where the transmittance is 50% or lower, even when the film is viewed at a larger angle to the film surface, a change in the color tone is not likely to occur. Furthermore, since the intensity distribution of the visible light transmittance is reduced as the wavelength of the light increases from 600 nm to 800 nm, by allowing a bandwidth where the transmittance is 80% or lower to exist in a wavelength range of 650 nm or longer, a change in the color tone can be suppressed and a high transparency and a high heat ray-shielding capability can both be attained.

Similarly, it is also preferred that the multilayer film have a transmittance of 80% or lower at a wavelength of 400 to 450 nm. In cases where interference reflection is utilized as in the case of the multilayer film, high-order interference reflection occurs in addition to primary interference reflection by which the most intense light is emitted. Third-order interference reflection has particularly high intensity and it occurs at about ⅓ of the wavelength of the bandwidth where primary interference reflection occurs. Therefore, when primary interference reflection occurs in a wavelength range of 1,200 nm or longer, third-order interference reflection occurs at a wavelength of 400 nm or longer. Similarly to primary interference reflection, such high-order interference reflection also undergoes a low-wavelength shift in accordance with an increase in the angle of the incident light with respect to the film surface. However, by providing absorption in this bandwidth, a change in the color tone caused by such phenomenon of low-wavelength shift can be suppressed and, as in the case of transmittance in a wavelength range of 600 to 800 nm, since the wavelength range of 400 to 450 nm also accounts for only 1% of the intensity distribution of visible light and this is extremely small as compared to the wavelength range of 500 to 600 nm which accounts for 76% of the intensity distribution of visible light, a reduction in the light transmittance can be suppressed. Moreover, since an improvement in the heat ray-shielding performance has a greater effect on a reduction of transmittance in the visible light region than in the near-infrared region, by further controlling only the transmittance in a wavelength range of 400 to 450 nm to suppress the visible light transmittance by 1%, the solar transmittance can be reduced by 8.9%. Therefore, as compared to a reduction of 0.2% in the solar transmittance, which is attained by controlling only the transmittance in a wavelength range of 500 to 600 nm and suppressing the visible transmittance by 1%, an effect of efficiently improving the heat ray-shielding performance without reducing the transparency can also be attained by controlling only the transmittance in a wavelength range of 400 to 450 nm. In this manner, when the transmittance is 80% or lower in a wavelength range of 400 to 450 nm, the primary interference reflection bandwidth arranged in the near-infrared region can be extended to a wavelength range of 1,300 to 1,400 nm. Consequently, since both primary interference reflection and high-order interference reflection can be incorporated at the same time for improving the heat ray-shielding performance, the heat ray-shielding performance can be more efficiently improved. The transmittance in a wavelength range of 400 to 450 nm is preferably 50% or lower, more preferably 30% or lower. The further reduced is the transmittance in this wavelength range, the more suppressed the change in the color tone caused by different angles to the film surface. Further, it is also preferred that light absorption have greater contribution as a transmittance-reducing factor than light reflection. When the light transmittance is reduced by absorption, since there is no shift of the bandwidth caused by change in the angle to the film surface, the color tone can be stabilized.

To obtain a film having the above-described optical characteristics, it is preferred that the multilayer film comprise at least one layer containing a colored component whose average transmittance in a wavelength range of 400 to 450 nm or 600 to 800 nm is lower than that in a wavelength range of 450 to 600 nm. Needless to say, the average transmittance in a wavelength range of 400 to 450 nm and that in a wavelength range of 600 to 800 nm may both be lower than the average transmittance in a wavelength range of 450 to 600 nm.

Whether or not the colored component has the above-described property is judged by the following method. First, in cases where the colored component is specified, the transmittance of a monolayer film of the thermoplastic resin A or B containing the colored component is measured in a wavelength range of 400 to 800 nm and then the average transmittances in a wavelength ranges of 400 to 450 nm, 600 to 800 nm and 450 to 600 nm are determined, thereby a judgment can be made.

Meanwhile, in cases where the colored component cannot be specified, whether or not the colored component has the above-described property is judged based on the "corrected average transmittance" determined by the following method.

First, for the subject multilayer film containing the colored component, the transmittance in a wavelength range of 400 to 800 nm is measured and the average transmittances in a wavelength ranges of 400 to 450 nm, 450 to 600 nm and 600 to 800 nm are defined as the average transmittances A1, A2 and A3, respectively.

Then, light is incident through either surface of the multilayer film to measure the reflectance in a wavelength range of 400 to 800 nm and the average reflectances in a wavelength ranges of 400 to 450 nm, 450 to 600 nm and 600 to 800 nm are defined as the average reflectances B1, B2 and B3, respectively.

Further, light is incident through the other surface of the multilayer film to measure the reflectance in a wavelength range of 400 to 800 nm and the average reflectances in a wavelength ranges of 400 to 450 nm, 450 to 600 nm and 600 to 800 nm are defined as the average reflectances C1, C2 and C3, respectively.

Thereafter, based on the methods (1) and (2) described below, the relationship between the average transmittance in a wavelength range of 400 to 450 nm or 600 to 800 nm and the average transmittance in a wavelength range of 450 to 600 nm is judged.

(1) Relationship Between Average Transmittance in Wavelength Range of 400 to 450 nm and Average Transmittance in Wavelength Range of 450 to 600 nm The average reflectance B1 and the average reflectance C1 are compared. When the average reflectance B1 is larger than the average reflectance C1, the average transmittance A1 and the average reflectance B1 are added and the resulting value is defined as the "corrected average transmittance" in a wavelength range of 400 to 450 nm. Further, the average transmittance A2 and the average reflectance B2 are added and the resulting value is defined as the "corrected average transmittance" in a wavelength range of 450 to 600 nm.

Meanwhile, when the average reflectance C1 is larger than the average reflectance B1, the average transmittance A1 and the average reflectance C1 are added and the resulting value is defined as the "corrected average transmittance" in a wavelength range of 400 to 450 nm. Further, the average transmittance A2 and the average reflectance C2 are added and the resulting value is defined as the "corrected average transmittance" in a wavelength range of 450 to 600 nm.

Then, the thus obtained "corrected average transmittance" in a wavelength range of 400 to 450 nm and "corrected average transmittance" in a wavelength range of 450 to 600 nm are compared to judge whether the average transmittance in a wavelength range of 400 to 450 nm is lower than the average transmittance in a wavelength range of 450 to 600 nm.

(2) Relationship Between Average Transmittance in Wavelength Range of 600 to 800 nm and Average Transmittance in Wavelength Range of 450 to 600 nm The average reflectance B3 and the average reflectance C3 are compared. When the average reflectance B3 is larger than the average reflectance C3, the average transmittance A3 and the average reflectance B3 are added and the resulting value is defined as the "corrected average transmittance" in a wavelength range of 600 to 800 nm. Further, the average transmittance A2 and the average reflectance B2 are added and the resulting value is defined as the "corrected average transmittance" in a wavelength range of 450 to 600 nm.

Meanwhile, when the average reflectance C3 is larger than the average reflectance B3, the average transmittance A3 and the average reflectance C3 are added and the resulting value is defined as the "corrected average transmittance" in a wavelength range of 600 to 800 nm. Further, the average transmittance A2 and the average reflectance C2 are added and the resulting value is defined as the "corrected average transmittance" in a wavelength range of 450 to 600 nm.

Then, the thus obtained "corrected average transmittance" in a wavelength range of 600 to 800 nm and "corrected average transmittance" in a wavelength range of 450 to 600 nm are compared to judge whether the average transmittance in a wavelength range of 600 to 800 nm is lower than the average transmittance in a wavelength range of 450 to 600 nm.

It is preferred that the multilayer film comprise at least one layer containing a colored component whose average transmittance in a wavelength range of 400 to 450 nm or 600 to 800 nm is lower by 10% or more as compared to the average transmittance in a wavelength range of 450 to 600 nm. As the average transmittance in a wavelength range of 400 to 450 nm or 600 to 800 nm becomes lower as compared to the average transmittance in a wavelength range of 450 to 600 nm, changes in the color tone caused by varying angle to the film surface can be better suppressed while reducing the effect on the visible light transmittance.

The layer containing a colored component is not particularly specified and the colored component may be contained in either or both of the thermoplastic resins A and B. Alternatively, a colored layer may be separately arranged on either or both sides of a laminate in which the thermoplastic resins A and B are alternately laminated.

It is preferred that the multilayer film comprise a reflection bandwidth of not smaller than 50 nm where the reflectance is 30% or higher in a wavelength range of 400 to 800 nm. The term "reflectance" is defined as the reflectance of white light incoming at an incident angle of 12°. By providing a reflection bandwidth in the above-described wavelength range, sunlight can be efficiently reflected, so that high heat ray-shielding performance can be imparted. It is more preferred that the multilayer film comprise a reflection bandwidth of not smaller than 50 nm where the reflectance is 50% or higher in a wavelength range of 400 to 800 nm and in this case, the multilayer film can exert superior heat ray-shielding performance. Further, when white light incoming at an incident angle of 12° is reflected in this wavelength range and the reflected light as a C* value of 40 or less, the multilayer film can be suitably used in those applications were transparency is demanded. Examples of a method of arranging a reflection bandwidth of not smaller than 50 nm where the reflectance is 30% or higher in a wavelength range of 400 to 800 nm include, as in the case of providing reflection in a wavelength range of 900 to 1,200 nm, a method in which a layer having a thickness that allows primary interference reflection to occur in a desired bandwidth; and a method of utilizing high-order interference reflection that occurs in association with primary interference reflection designed to occur at a wavelength of 800 nm or longer. Particularly in the latter case, since both primary interference reflection and high-order interference reflection can be incorporated at the same time for improving the heat ray-shielding performance, the heat ray-shielding performance can be more efficiently improved.

In the multilayer film, it is preferred that the average reflectance in a wavelength range of 1,200 to 1,400 nm be 30% or higher and the average reflectance in a wavelength range of 400 to 450 nm, which is measured from at least one side of the film, be 30% or lower. The wider becomes the reflection bandwidth, the higher becomes the rate at which heat-ray can be shielded, so that the heat ray-shielding performance can be improved. Meanwhile, in a method of bringing about interference reflection by setting the optical thickness of alternately laminated layers to be ¼ of a desired reflection wavelength (1,200 to 1,400 nm), which is called "λ/4 design," although the reflectance in the desired reflection bandwidth (1,200 to 1,400 nm) is improved, reflection called "third-order reflection" occurs also at a wavelength of about ⅓ of the desired reflection wavelength. Thus, strong interference reflection occurs also in the reflection bandwidth of 400 to 450 nm, which corresponds to ⅓ of the wavelength of 1,200 to 1,400 nm. For example, when a film is designed to have an average reflectance of 50% or higher in a wavelength range of 1,200 to 1,400 nm, the average reflectance in a wavelength range of 400 to 450 nm becomes 30% or higher. In addition, when a light having a wavelength of 400 to 450 nm is reflected, the reflected light shows blue color. Therefore, from the standpoint of the color tone, it may not be preferable to use such a film in a window glass of a vehicle, such as an automobile or a train, or a window glass of a building.

Furthermore, depending on the incident angle of light, the interference reflection bandwidth may shift to the lower wavelength side and consequently, the third-order reflection bandwidth may also be shifted toward the lower wavelength side out of the visible wavelength region. In such a case, third-order reflection cannot be perceived by human eyes. That is, depending on the incident angle of light, third-order reflection may appear in blue or may not be seen at all. It may not be preferable to use such a film in a window glass of a vehicle, such as an automobile or a train, or a window glass of a building, because the color tone becomes variable depending on the viewing angle and background reflection and the like occur due to reflection of visible light.

Therefore, it is preferred that the average reflectance in a wavelength range of 1,200 to 1,400 nm be 30% or higher and the average reflectance in a wavelength range of 400 to 450 nm, which is measured from at least one side of the film, be 30% or lower. By this, coloration and background reflection that are caused by reflection of visible light can be inhibited. The average reflectance in a wavelength range of 1,200 to 1,400 nm is more preferably 50% or higher, still more preferably 70% or higher. The higher becomes the average reflectance in a wavelength range of 1,200 to 1,400 nm, the more improved is the heat ray-shielding performance, so that the resulting film becomes more suitable for a window glass of a vehicle, such as an automobile or a train, or a window glass of a building. This is achieved by increasing the number of the thermoplastic resin layers that are alternately laminated and the average reflectance in a wavelength range of 1,200 to 1,400 nm is easily controlled at 30% or higher as long as the total number of the layers is not less than 400. The total number of the layers is preferably not less than 600, more preferably not less than 800. Further, it is also preferred that the average reflectance in a wavelength range of 400 to 450 nm be 20% or lower. By controlling the average reflectance in a wavelength range of 400 to 450 nm to be low, variations in the color tone of the reflected light and background reflection can be further inhibited. As described below, this is achieved by using, for example, a method where the reflected light-absorbing effect of a colored component is utilized.

In the multilayer film, it is preferred that the maximum reflectance in a wavelength range of 500 to 700 nm be 15% or lower. Although the heat ray-shielding performance is improved in a wavelength range of 500 to 700 nm, since the visible light transmittance is reduced beyond the effect of the improvement, there are cases where it is not preferable to use such a film particularly in those applications where transparency is required. By controlling the maximum reflectance in a wavelength range of 500 to 700 nm to be 15% or lower, a multilayer film having a sufficiently high visible light transmittance can be obtained. Further, although an increase in the reflectance in a wavelength range of 500 to 700 nm may lead to a problem such as occurrence of background reflection on the film surface, such background reflection can also be inhibited as long as the maximum reflectance in a wavelength range of 500 to 700 nm is 15% or lower. It is preferred that the minimum transmittance in a wavelength range of 500 to 700 nm be 85% or higher. By being able to suppress a reduction in the transmittance caused by not only reflection but also absorption, a multilayer film having a higher transparency can be obtained.

It is preferred that the multilayer film comprise a colored component in at least one of the thermoplastic resins. The term "colored component" used herein refers to a component which absorbs lights having a wavelength of 400 to 800 nm. By containing such a colored component, although a the multilayer film exhibits a color originated the colored component, since the colored component is different from the multilayer film in that it does not induce a shift in the light absorption bandwidth caused by a difference in the incident angle of transmitted light, the changes in the color tone due to varying viewing angle can be suppressed. As for the amount of such a colored component to be used, it is preferred that the colored component be used in such an amount that the visible light transmittance is 70% or higher. In this case, a film which has high heat ray-shielding performance and transparency as well as high stability of color tone for varying angles to the film surface can be obtained.

Such colored component is not particularly restricted as long as it absorbs lights having a wavelength of 400 to 800 nm, and any of known pigments, dyes and the like can be employed. From the standpoints of heat resistance and weathering resistance, it is preferred to use a pigment. The multilayer film is exposed to a high temperature for an extended period in its production step and the subsequent step of processing into a glass or the like. Therefore, when a colored component having poor heat resistance is used, there may arise problems of, for example, color change, contamination of apparatuses and the resulting product due to bleeding out of the colored component, and degradation with time in a long-term use. However, these problems can be suppressed by using a pigment having excellent heat resistance and weathering resistance rather than a dye. Furthermore, in those window glasses of vehicles and buildings to which the multilayer film is applied, transparency, particularly a low haze is often demanded; therefore, it is also preferred to use an organic pigment. Since an organic pigment is more easily dispersed in the resins that are materials of multilayer film as compared to an inorganic pigment, by using an organic pigment, a highly transparent multilayer film having a low haze can be easily obtained. Examples of such an organic pigment include phthalocyanine pigments, azo pigments, anthraquinone pigments, thioindigo pigments, perinone pigments, perylene pigments, quinacridone pigments, dioxazine pigments, isoindolinone pigments, quinophthalone pigments, isoonodoline pigments, nitroso pigments, alizarin lake pigments, metal complex azomethine pigments, aniline black and alkali blue.

Further, it is preferred that the thermoplastic resin containing the above-described colored component be a noncrystalline resin. In the multilayer film, as described in the above, to attain high heat ray-reflecting performance, it is preferred that one of the thermoplastic resins be a crystalline resin and the other thermoplastic resin be a noncrystalline resin. Moreover, as described below, the multilayer film is often subjected to uniaxial or biaxial stretching. In this case, if the colored component is added to a crystalline resin, the colored component cannot conform to the deformation of the crystalline resin in the stretching step, so that aggregation of the colored component, void formation and the like may occur to cause an increase in the haze and a reduction in the transparency. Meanwhile, when the colored component is added to a noncrystalline resin, the stretching conformability of the colored component in the stretching step can be improved and, as described below, the noncrystalline resin can be re-melted by performing a heat treatment at a relatively low temperature. Therefore, aggregation of the colored component and void formation can be suppressed.

Further, as described in the above, also from the standpoint of controlling the average reflectance in a wavelength range of 1,200 to 1,400 nm to be 30% or higher and the average reflectance in a wavelength range of 400 to 450 nm to be 30% or lower, it is effective the multilayer film comprise a colored component. For example, by incorporating a colored component that absorbs lights having a wavelength of 400 to 450 nm into at least one of the resins constituting the multilayer film, when light transmits through the multilayer film, the light having the above-described wavelength is absorbed by the colored component and consequently, reflected light generated by interference reflection can also be absorbed, so that the average reflectance in a wavelength range of 400 to 450 nm can be reduced. Further, preferably, a colored component which absorbs lights having a wavelength of 650 to 800 nm is used in combination. When a colored component which absorbs lights having a wavelength of 400 to 450 nm is used, an effect of reducing the average reflectance for lights having a wavelength of 400 to 450 nm is exerted. However, at the same time, transmitted light may exhibit yellow color. Therefore, the use of such a film in a window glass of a vehicle such as an automobile or a train or in a window glass of a building, and light through the window glasses may show yellow. Therefore, the use may pose a problem in terms of the color tone of transmitted light. In view of this, a colored component that absorbs lights having a wavelength of 650 to 800 nm which yields transmitted light of blue color is used in combination and in this case, by the effect of color mixing between yellow and blue, the resulting film can be made to show green color or achromatic color. It is noted here that the amount of the above-described colored component to be added and the like should be designed as appropriate.

It is preferred that the multilayer film have an internal haze of 3% or less. The term "internal haze" used herein refers to a value obtained by haze measurement excluding the effect of surface reflection, specifically a haze value which is obtained by filling a quartz cell with 1,2,3,4-tetrahydronaphthalene (tetralin; liquid), placing the subject film in the liquid and then measuring the film. Since a high transparency is demanded in the window glasses of vehicles such as automobiles and trains and those of buildings, a lower haze is more preferred. A film having a low internal haze can be suitably used in such applications where a high transparency is demanded. The internal haze of the multilayer film is more preferably 1% or less, still more preferably 0.5% or less. The lower the internal haze, the more suitable is the multilayer film for an application where transparency is demanded. Particularly, when the internal haze is 0.5% or less, the multilayer film can also be applied to windshields of automobiles, trains and the like where a high transparency and a low haze are required. As a method of achieving such a low internal haze, for example, as described in the above, an organic pigment may be used or a colored component may be incorporated in the noncrystalline resin.

Further, in the multilayer film, it is preferred that the above-described colored component contained therein have a melting point of 300° C. or lower. A polyester resin represented by polyethylene terephthalate is used as a thermoplastic resin. An ordinary polyester resin can be stably extrusion-molded at a temperature of up to about 300° C. Therefore, as long as the melting point of the colored component is 300° C. or lower, the internal haze can be easily suppressed by melting the colored component in an extruder.

It is preferred that the melting point of the colored component satisfy the following equation:

$$AT \leq HT + 50° C.$$

In the above equation, AT represents the melting point (° C.) of the colored component and HT represents the melting point (° C.) of a thermoplastic resin which has the highest melting point among those thermoplastic resins contained in the multilayer film. By satisfying the above equation, when the colored component is incorporated into a thermoplastic resin used in the multilayer film, it is melted in an extruder in the same manner as the thermoplastic resin. Therefore, the dispersion state of the colored component in the thermoplastic resin is further improved and consequently, the internal haze of the resulting film is easily suppressed.

It is preferred that the multilayer film comprise a colored component as described in the above, and it is also preferred that the multilayer film, in which two or more thermoplastic resins having different optical properties are alternately laminated, comprise a colored layer containing a colored component on at least one surface. In cases where a colored component is incorporated into a thermoplastic resin constituting a multilayer film, a multilayer film containing the colored component can be obtained by the same production steps as those used for producing a multilayer film containing no colored component, which is advantageous from the cost standpoint. In addition, since a multilayer film having mechanical/physical properties, surface characteristics and processing characteristics that are almost the same as those of a multilayer film containing no colored component can be obtained, there is also an advantage that the applicability of these two types of multilayer films to commercialization for window glasses of vehicles and buildings are not largely different. Moreover, the colored component can be selected from a wide range of options. In cases where a colored layer is arranged only on one surface of the multilayer film, since a light incoming through the surface having no colored layer is subjected to interference reflection inside the multilayer film without being affected by a colored component, a high reflection efficiency can be maintained.

The method of arranging such a colored layer is not particularly restricted and examples thereof include a method in which a colored layer is formed by co-extrusion and a method in which a colored layer is formed by coating or printing. In cases where a colored layer is formed by co-extrusion, similarly to the case of incorporating a colored component into a thermoplastic resin constituting a multilayer film, a multilayer film having a colored layer can be obtained by almost the same process as in the case of producing a multilayer film having no colored layer. Therefore, a colored layer can be formed at a low cost. Meanwhile, in cases where a colored layer is formed by coating or printing, particularly because the resins are not restricted, it is suitably for obtaining a multilayer film having excellent dispersion of a colored component and a high transparency. In this case, a resin is preferably used as a binder of a colored component in the colored layer. The binder may be any resin as long as it functions as a binder, and it may be a thermoplastic resin or a thermosetting or photo-curing resin. Further, the binder is preferably a resin having transparency and examples thereof include polyester resins, acrylic resins, fluorocarbon resins, silicon-based resins, melamine-based resins, vinyl chloride resins, vinyl butyral resins, cellulose-based resin and polyamide resins. Thereamong, an acrylic resin which is inexpensive and has excellent photostability is particularly preferred.

In the multilayer film, it is preferred that a colored layer A be arranged on one side thereof and a colored layer B be arranged on the other side; and that the absorption rates (Abs(W)) of the colored layers A and B at a wavelength (W) satisfy the Equations 1 and 2 described below. The term "absorption rate" used herein refers to a ratio of intensity at which a light incoming at an incident angle of 12° is absorbed by the colored layer A or B, wherein the intensity of a light corresponding to the wavelength (W) is taken as 100. Further, of these colored layers arranged on the respective film surfaces, one which has smaller absorption rate at a wavelength of 450 nm is referred to as "colored layer A" and the other is referred to as "colored layer B". When viewing the color tone of the multilayer film, the color tones of two lights, a light transmitting through the multilayer film and a light reflected by the multilayer film, present a problem. Depending on the application, acceptable color tone may be different and particularly in an application where the color tone is exposed to the public eye, such as a window glass of a vehicle or a building, a reddish color tone is not preferred. By satisfying the below-described Equation 2, the majority of lights incoming from the side of the colored layer A and having a wavelength of around 700 nm are absorbed by the colored layer A. Therefore, consequently, the intensity of reflected lights having a wavelength of around 700 nm is weakened and the film is made to show a bluish color tone. In addition, since it becomes possible to control the intensity of reflected lights having a wavelength of around 700 nm can be controlled, even when a multilayer film, which shows interference reflection in the near-infrared region (900 to 1,200 nm) when viewed at an incident angle of 0° with respect to the film surface, is viewed at a large incident angle (60° or larger) with respect to the film surface and the interference reflection bandwidth undergoes a low-wavelength shift, the interference reflection is weakened by the effect of an absorption layer arranged for lights having a wavelength of around 700 nm, so that the color tone can be stabilized. Meanwhile, when the below-described Equation 1 is satisfied, in addition to allowing lights having a wavelength of around 450 nm, which show a relatively acceptable interference color, to be efficiently reflected, by controlling the transmittance of a transmitted light having a wavelength of 450 nm in the absorption of the colored layer B, a stable color tone of transmitted light and high heat ray-shielding performance can be imparted to the multilayer film. More preferably, the colored layer A has an absorption rate of 10% or lower at a wavelength of 450 nm and the colored layer B has an absorption rate of 30% or higher at a wavelength of 450 nm. In addition, the colored layer A has an absorption rate of 30% or higher at a wavelength of 700 nm and the colored layer B has an absorption rate of 10% or lower. In this manner, by allowing the light absorption rate at a wavelength of either 450 nm or 700 nm to be higher in one of the colored layers and lower in the other, a desired effect can be attained more efficiently.

Further, as described in the above, when a film is designed to reflect lights having a wavelength of 1,200 to 1,400 nm, in theory, lights having a wavelength of 400 to 450 nm are also reflected; however, in other application or film design, blue reflected light may not be preferable. In such a case, it is preferred that either the below-described Equation 1 or Equation 2 be satisfied. By satisfying the Equation 1, the majority of lights incoming from the side of the colored layer B and having a wavelength of around 450 nm are absorbed by the colored layer B. Therefore, consequently, the intensity of reflected lights having a wavelength of around 450 nm is weakened, so that the color tone of reflected lights can be made achromatic and a change in the color tone caused by a low-wavelength shift of reflection bandwidth can be suppressed. Meanwhile, by satisfying the below-described Equation 2, lights having a wavelength of around 700 nm can be efficiently reflected. In addition, by suppressing a change the transmittance of a transmitted light having a wavelength of 700 nm in the absorption of the colored layer A, which is caused by a low-wavelength shift of interference reflection, a stable color tone of transmitted light and high heat ray-shielding performance can be imparted to the multilayer film.

$$\text{Abs}_A(450) < \text{Abs}_B(450) \quad (1)$$

$$\text{Abs}_A(700) > \text{Abs}_B(700) \quad (2)$$

It is preferred that the multilayer film comprise not less than 10 pairs of adjacent layers whose sum of the optical thicknesses is 600 to 700 nm. The term "pair" used herein refers to a pair of two adjacent layers. When the sum of the optical thicknesses of adjacent layers is 600 to 700 nm, primary interference reflection can be introduced to a wavelength range of about 1,200 nm to about 1,400 nm and a reflection bandwidth can thus be provided in a high wavelength range. Therefore, the heat ray-shielding performance can be improved. In addition, when the sum of the optical thicknesses of adjacent layers is set to be 600 to 700 nm, third-order interference reflection can be introduced to a wavelength range of about 400 nm to 450 nm. In a wavelength range of 400 to 450 nm, since the distribution ratio of visible light is greatly smaller as compared to a wavelength range of 500 to 700 nm, the heat ray-shielding performance can be improved while suppressing a reduction in the visible light transmittance. Furthermore, when the number of pairs of adjacent layers whose sum of the optical thicknesses is 600 to 700 nm is 10 or more, interference reflection preferable for attaining the above-described effect can be imparted to the multilayer film. It is preferred that the multilayer film comprise not less than 10 consecutive pairs of adjacent layers whose sum of the optical thicknesses is 600 to 700 nm, and it is more preferred that the multilayer film comprise not less than 100 consecutive pairs of such adjacent layers. By allowing pairs of adjacent layers whose sum of the optical thicknesses is 600 to 700 nm to exist continuously, interference reflection can be imparted to the multilayer film more efficiently and, as the number of such pairs of adjacent layers is increased, the intensity of interference reflection can be further increased as well. By allowing the multilayer film to have 100 or more consecutive pairs of adjacent layers whose sum of the optical thicknesses is 600 to 700 nm, the average reflectance of primary interference reflection in a wavelength range of 1,200 to 1,400 nm and the average reflectance of third-order interference reflection in a wavelength range of 400 to 450 nm can be easily controlled to be not lower than 70% and not lower than 30%, respectively.

Further, to control the average reflectance in a wavelength range of 1,200 to 1,400 nm to be 30% or higher and the average reflectance in a wavelength range of 400 to 450 nm, which is measured from at least one side of the film, to be 30% or lower, it is also preferred that the multilayer film comprise not less than 10 pairs of adjacent layers whose sum of the optical thicknesses is 600 to 700 nm; and at least one layer which contains a colored component whose average transmittance in a wavelength range of 400 to 450 nm is lower than that in a wavelength range of 450 to 600 nm. As described in the above, an effect of improving the heat ray-shielding performance can be attained by introducing primary interference reflection to a wavelength range of about 1,200 nm to about 1,400 nm. However, third-order interference reflection occurs in a wavelength range of 400 to 450 nm. By allowing the multilayer film to comprise at least one layer which contains a colored component whose average transmittance in a wavelength range of 400 to 450 nm is lower than that in a wavelength range of 450 to 600 nm, reflected lights generated by third-order interference reflection can be absorbed and suppressed by the colored component, so that the average reflectance in a wavelength range of 400 to 450 nm, which is measured from at least one side of the film, can be easily controlled to be 30% or lower.

The multilayer film has a solar reflectance of preferably 30% or higher, more preferably 40% or higher. The term "solar reflectance" used herein refers to the solar reflectance defined in JIS A5759. When the solar reflectance is 30% or higher, high heat ray-shielding performance can be imparted to the multilayer film while inhibiting breakage of glass caused by absorption of heat ray. This can be achieved by, for example, controlling the average reflectance in a wavelength range of 400 to 700 nm to be 15% to less than 40% and the average reflectance in a wavelength range of 900 to 1,200 nm to be 70% or higher. It is more preferred that the solar reflectance be 30% or higher and the visible light transmittance be 70% or higher, and it is still more preferred that the solar reflectance be 40% or higher and the visible light transmittance be 70% or higher. It is most preferred that the solar reflectance be 50% or higher and the visible light transmittance be 70% or higher.

The term "visible light transmittance" used herein refers to $T_{VIS}$ defined in ISO 9050. It is needless to say that the heat ray-shielding performance is improved as the solar reflectance is increased. However, by having a visible light transmittance of 70% or higher, the multilayer film can be used also in those applications where a high transparency is demanded, such as windshields of automobiles. This can be achieved by controlling the reflectance in a wavelength range of 400 to 700 nm in particular to be 30% to 40% or by providing reflective performance in a wavelength range of 1,200 or longer by the below-described design method and, for this purpose, it is preferred that the multilayer film comprise not less than 10 pairs of adjacent layers whose sum of the optical thicknesses is 600 to 700 nm.

It is preferred that the multilayer film have an average reflectance of 15% to less than 40% in a wavelength range of 400 to 700 nm. Sunlight has a large intensity distribution particularly in the visible wavelength region of 400 to 700 nm and this accounts for about 44% of the total sunlight intensity. Therefore, when the average reflectance in a wavelength range of 400 to 700 nm is lower than 15%, the visible light transmittance is improved and a colorless multilayer film can be obtained. However, since the performance of reflecting the sunlight of visible wavelength region is poor, the heat ray-shielding performance of the multilayer film has a limit in its capacity. Further, when the transmission of sunlight is suppressed by absorption, a portion of the absorbed light enters into the multilayer film in the form of heat. However, when the transmission of sunlight is suppressed by reflection, since there is no such influx of heat, the heat ray-shielding performance can be improved, making the resulting multilayer film preferable. A wavelength range of 400 to 700 nm accounts for about 81% of the total visible light intensity; therefore, the reflectance is increased in this range, that is, the transmittance is reduced. Accordingly, the visible light transmittance becomes insufficient, making the multilayer film not usable in those applications where transparency is demanded, such as window glasses of automobiles, trains and buildings. Thus, to maintain a sufficient visible light transmittance, it is required that the average reflectance in a wavelength range of 400 to 700 nm be less than 40%. When the average reflectance is 15% to less than 40% in a wavelength range of 400 to 700 nm, high heat ray-shielding performance can be imparted to the multilayer film while maintaining sufficient transparency. The average reflectance in a wavelength range of 400 to 700 nm is preferably 20% to less than 40%, more preferably 25% to less than 35%. In this case, heat ray-shielding performance can be imparted to the multilayer film while maintaining its transparency at a level where the multilayer film can be used also in those applications where a high transparency is demanded, such as windshields of automobiles. A multilayer film having an average reflectance of 15% or higher in a wavelength range of 400 to 700 nm can be obtained by introducing interference reflection to the entirety or a part of the wavelength range of 400 to 700 nm.

In the multilayer film, it is preferred that the difference between the maximum reflectance and the minimum reflectance in a continuous 100-nm bandwidth within a wavelength range of 400 to 700 nm be less than 10%. In the visible wavelength region of 400 to 700 nm, a slight difference between the reflectances at different wavelengths causes a difference in the color tone. Further, in a multilayer such as the one according to the present invention, the reflection wavelength is changed also by a slight difference in the light incident angle or the film thickness, and even a slight difference in the resulting reflectance leads to a change in the color tone. Particularly, in window glass applications, since it is necessary to visually recognize objects from various angles, it is required that a change in the color tone caused by different light incident angles be even smaller. When the difference between the maximum reflectance and the minimum reflectance in a continuous 100-nm bandwidth within a wavelength range of 400 to 700 nm is less than 10%, a change in the color tone caused by a difference in the film thickness or light incident angle can be suppressed, so that a film which is suitably used in window glass applications in particular can be obtained. Preferably, the difference between the maximum reflectance and the minimum reflectance in a continuous bandwidth of at least 100 nm within a wavelength range of 400 to 700 nm is 5% or less and, in this case, a change in the color tone caused by a difference in the film thickness or light incident angle can hardly be observed. Further, in another preferred mode, the difference between the maximum reflectance and the minimum reflectance in the entirety wavelength range of 400 to 700 nm is less than 10%. In this case, since the film shows an almost uniform reflectance over the entire visible wavelength region, the coloration of the film itself can be suppressed, so that a film which is substantially colorless regardless of variation in the film thickness or light incident angle is obtained. Such a multilayer film can be obtained by, as described below, allowing a multilayer film, which has a layer thickness distribution comprising a plurality of inclined structures, to be capable of reflecting lights having a wavelength of 400 to 700 nm.

It is preferred that the multilayer film comprise: at least one component (Ln) in which two or more thermoplastic resins having different optical properties that reflect lights having a wavelength of 900 to 1,400 nm are alternately laminated; and at least one component (Lv) in which two or more thermoplastic resins having different optical properties that reflect lights having a wavelength of 400 to 700 nm are alternately laminated. The term "component" used herein refers to a group of layers that reflect a light of a primary reflection wavelength or a reflection bandwidth, which relates to a design. By comprising such components (Ln and Lv), the multilayer film is capable of reflecting lights having a wavelength of 400 to 700 nm as well as lights having a wavelength of 900 to 1,400 nm.

In a more preferred mode of the multilayer film, the number of layers contained in the component (Ln) is greater the number of layers contained in the component (Lv). In this case, for example, when the respective components are composed of the same combination of resins, the reflectances in a wavelength range of 900 to 1,400 nm can be more improved than the reflectances in a wavelength range of 400 to 700 nm, so that a multilayer film having an average reflectance of 15% to less than 40% in a wavelength range of 400 to 700 nm and an average reflectance of 70% or higher in a wavelength range of 900 to 1,200 nm can be achieved. One of the advantages of this case is that, since the stability of the color tone, which is affected by a change in the angle to the film surface, and the heat ray-shielding performance can be improved without unnecessarily increasing the film thickness, deterioration in the ease of handling and occurrence of defective molding in the step of producing a laminated glass that are caused by an increase in the film thickness can be suppressed.

Further, examples of a preferred mode of the multilayer film also include a multilayer film in which the difference in the in-plane average refractive indices of the layers constituting the component (Ln) is greater by 0.01 or more than that of the layers constituting the component (Lv). In this case, when the components have the same number of layers, the reflectance of the component (Ln) having a larger difference in the in-plane average refractive indices of its layers becomes higher; therefore, a multilayer film having an average reflectance of 15% to less than 40% in a wavelength range of 400 to 700 nm and an average reflectance of 70% or higher in a wavelength range of 900 to 1,200 nm can be achieved. One advantage of this case is that, since the physical properties of the multilayer film can be controlled by using different thermoplastic resins, a film which is more suitable for the step of producing a laminated glass can be obtained.

As a method of arranging the above-described components, layer thickness distributions corresponding to the respective components can be formed by using the below-described multi-layer laminating apparatus comprising a feed block. However, in the multilayer film, it is also preferred that an adhesive layer exist between the component (Ln) and the component (Lv). In the multilayer film, to enable the multilayer film to reflect lights over a very wide bandwidth, the number of layers tends to be high. As the number of layers increases, it becomes more likely that an inconsistency in the layer thicknesses occurs during movement in a multi-layer laminating apparatus. Therefore, it may become difficult to obtain a multilayer film having a desired layer thickness distribution. Further, in cases where the component (Ln) and the component (Lv) are composed of different combinations of thermoplastic resins, when it is tried to produce a film in one multi-layer laminating apparatus, the constitution of the multi-layer laminating apparatus tends to be made complex or increased in size, so that an increase in the cost of the production apparatus, an increase in the production space, a reduction in the lamination accuracy and the like may occur. However, by laminating different films via an adhesive layer, a multilayer film having a high lamination accuracy can be simply produced by using a smaller apparatus, so that a multilayer film having a desired heat ray-shielding performance can be obtained.

In the multilayer film, particularly, in cases where a layer composed of a thermoplastic resin A (layer A) and a layer composed of a thermoplastic resin B having an optical property different from that of the thermoplastic resin A (layer B) are alternately laminated, the reflectance of the multilayer film is determined by the below-described Equation 3. Normally, in a multilayer film used for this purpose, by designing the multilayer film such that the ratio of optical thickness (k) defined by the below-described Equation 4 becomes 1, second-order reflection by a component (Ln), which is designed to reflect lights having a wavelength of 900 to 1,400 nm, is suppressed. However, in the multilayer film, it is also preferred that the ratio of optical thicknesses (k) be 1.25 or higher. In this case, by intentionally introducing second-order reflection, it is possible to allow the multilayer film to reflect lights having a wavelength of 450 to 700 nm by utilizing a layer which reflects lights having a wavelength of 900 to 1,400 nm and to reflect lights having a wavelength of 400 to 500 nm by third-order reflection. As a result, high heat ray-shielding performance can be imparted even at a smaller number of layers. It is more preferred that a layer having a larger optical thickness be composed of a noncrystalline thermoplastic resin. In this case, while imparting high heat ray-shielding performance, a stress generated by stretching in the laminated glass production step at a curved portion of the resulting window glass can be reduced, so that defective molding in the laminated glass production step can be inhibited.

$$2 \times (na \cdot da + nb \cdot db) = \lambda, \quad (3)$$

$$|na \cdot da|/(nb \cdot db)| = k \quad (4)$$

na: in-plane average refractive index of layer A
nb: in-plane average refractive index of layer B
da: thickness (nm) of layer A
db: thickness (nm) of layer B
λ: main reflection wavelength (primary reflection wavelength)
k: ratio of optical thickness It is preferred that the multilayer film have a heat shrinkage of ±1% or less when heated at 140° C. for 30 minutes. In those window glasses of vehicles and buildings where the multilayer film is applied, from the safety standpoint, a laminated glass in which an interlayer is sandwiched between two glasses may be employed. In cases where the multilayer film is used in such a laminated glass, the multilayer film sandwiched between two interlayers is used in place of the interlayer of an ordinary laminated glass. In the process of producing this laminated glass, usually, a step of thermally press-bonding two glasses and the multilayer film via interlayers at a temperature of 100 to 140° C. is performed. However, in this step, the use of a multilayer film having a large heat shrinkage may cause defective molding in that wrinkles are formed in the film as a result of thermal contraction. When the heat shrinkage of the multilayer film is ±1% or less when heated at 140° C. for 30 minutes, also in the above-described step of producing a laminated glass, a laminated glass without any defect in the outer appearance such as a wrinkle can be obtained. This can be achieved by using a method of performing a relaxation treatment on a heat-treated film in the below-described film-forming step.

Further, it is preferred that the multilayer film have a stress of 10 MPa or less when elongated by 5% at 140° C. In this case, since the multilayer film can flexibly conform to a curved portion of a glass in the above-described step of producing a laminated glass, a good-quality laminated glass can be obtained. When thermoplastic resins having different optical properties are used, this can be achieved by incorporating a noncrystalline thermoplastic resin and increasing the thickness ratio of a layer composed of the noncrystalline thermoplastic resin. As the ratio of the noncrystalline thermoplastic resin becomes higher with respect to the ratio of a crystalline thermoplastic resin, the stress generated in the thermal press-bonding step can be more suppressed.

Next, a preferred method of producing the multilayer film will be described more specifically using a multilayer film composed of thermoplastic resins A and B as an example. However, the disclosure should not be interpreted in any restrictive way by the following description.

Two kinds of thermoplastic resins, A and B, are prepared in the form of pellets or the like. The pellets are dried in hot air or under vacuum as required and then fed to separate extruders. In the respective extruders, each resin is melted by heating at a temperature of not lower than its melting point and the amount of the resin to be extruded is then made uniform by a gear pump or the like, followed by removal of foreign substances, modified resin and the like through a filter or the like.

Alternatively, pellets that are prepared by kneading a colored component into the thermoplastic resin A or B may be used. In this case, a multilayer film containing a colored component can be obtained by the same subsequent steps as those used in the preparation of a multilayer film containing no colored component and, by using such pellets that are kneaded in advance, it is also possible to allow a colored component to be dispersed in a thermoplastic resin. Further, the thermoplastic resin A or B may also be blended with a thermoplastic resin containing a colored component before being fed to an extruder. In this case as well, in the same manner as in the case where pellets of thermoplastic resin A or B containing a colored component are prepared, a multilayer film containing a colored component can be obtained by the same subsequent steps as those used in the preparation of a multilayer film containing no colored component. In addition, as compared to the case where a colored component is kneaded into the thermoplastic resin A or B, an ordinary colored component master pellet may be more suitably applied and the content of the colored component can be controlled as needed by changing the blending ratio, which is advantageous from the cost and controllability standpoints.

The thermoplastic resins A and B are discharged from different flow paths using two or more extruders and then fed to a multi-layer laminating apparatus. As the multi-layer laminating apparatus, a multi-manifold die, a feedblock, a static mixer or the like can be used. However, particularly, in order to efficiently achieve the constitution, it is preferred to use a feedblock which separately comprises at least two members having a plurality of fine slits.

The laminate structure of the multilayer film can be easily realized in the same manner as described in the paragraphs [0053] to [0063] of JP-A No. 2007-307893. However, the gap and length of the slit plates are different as these values determine the layer thickness. The process of producing the laminate structure will now be described referring to FIG. 1. In FIG. 1, X represents the film transverse direction and Y represents the film thickness direction.

A multi-layer laminating apparatus 7 comprises three slit plates as in the apparatus described in JP-A No. 2007-307893. FIG. 2 shows an example of the layer thickness distribution of the laminate structure obtained by the multi-layer laminating apparatus 7. With the abscissa representing the layer alignment order 18 and the ordinate representing the thickness (nm) 19 of each layer, the laminate structure comprises three inclined structures: an inclined structure 11, which has a layer thickness created by a resin lamination flow formed by a slit plate 71; an inclined structure 12, which has a layer thickness created by a resin lamination flow formed by a slit plate 72; and an inclined structure 13, which has a layer thickness created by a resin lamination flow formed by a slit plate 73. Further, it is preferred that at least one of these inclined structures be inclined in the opposite direction to any one of other inclined structures. In addition, from the standpoint of suppressing the generation of a flow mark caused by unstable resin flow, a thick-film layer 20 of not less than 1 nm in thickness is arranged on each outermost layer. Moreover, each inclined structure formed by one slit plate is composed of a layer thickness distribution 21 of resin A and a layer thickness distribution 22 of resin B, and the layer thickness ratio can be easily adjusted by changing the amounts of the resins A and B that are extruded from two extruders. The layer thickness ratio can be determined as a ratio between the total thickness of thermoplastic resin A layer and the total thickness of thermoplastic resin B layer, excluding the thick-film layers. The thickness of each layer can be determined by observing the laminated cross-section under a transmission electron microscope. Further, by adjusting the overall thickness, since the thicknesses of the respective layers changes in proportion thereto, the absolute values of layer thickness can be adjusted. The term "average layer thickness" used herein means an average of the thicknesses of adjacent layers A and B. For example, in the layer thickness distribution of 601 layers, excluding two outermost thick-film layers, when 599 thin-film layers are arranged in the order of B1, A1, B2, A2, B3 . . . A299 and B300, the term "average layer thickness distribution" refers to a layer thickness distribution obtained by sequentially plotting the averages of Bm and Am (wherein, m is an integer), such as the average of B1 and A1, the average of B2 and A2 and so on.

The resin flows having a laminate structure that flowed out of the respective slit plates constituting the multi-layer laminating apparatus 7 are, as shown in FIG. 1(b), each discharged from an outlet port 11L, 12L or 13L of the multi-layer laminating apparatus and then rearranged in a converging device 8 to have the cross-sectional shape of 11M, 12M and 14M shown in FIG. 1(c). Subsequently, in a connecting pipe 9, the length of the flow path cross-section is increased in the film transverse direction and the resultant flows into a die 10. The resin flow is further widened in a manifold and extruded in a molten state from the lip of the die 10 into the form of a sheet and the resulting sheet is then cooled and solidified on a casting drum, thereby an unstretched film can be obtained. By controlling the width-enlarging ratio in the die, which is a value obtained by dividing the length of the die lip in the film transverse direction 17 by the length of the inlet part of the die in the film transverse direction 15, to be 5 or lower, disturbance in lamination caused by an increase in the width can be inhibited and a polarization reflector, which is a multilayer laminate film having a uniform reflectance and reflection bandwidth in the transverse direction, can be obtained. The width increase ratio is more preferably 3 or lower.

It is preferred that the thus obtained casting film be biaxially stretched as required. The term "biaxial stretching" refers to stretching in the machine and transverse directions. The stretching in the two directions may be performed sequentially or simultaneously. In addition, the thus stretched film may also be subjected to re-stretching in the machine direction and/or the transverse direction. Particularly, in the present invention, from the standpoint of reducing a difference in the in-plane orientation and preventing damage to the surface, it is preferred to employ simultaneous biaxial stretching.

First, the case of employing sequential biaxial stretching will be described. The term "stretching in the machine direction" used herein refers to stretching for imparting a film with a molecular orientation in the machine direction and it is usually performed by utilizing a difference in the peripheral speed between rolls. This stretching may be performed in a single step or in multiple steps using a plurality of roll pairs. The stretching ratio varies depending on the resin type; however, usually, it is preferably 2 to 15 times. When polyethylene terephthalate is used as one of the resins constituting the multilayer film, the stretching ratio is particularly preferably 2 to 7 times. Further, it is preferred that the stretching temperature be in the range of the glass transition temperature of a resin constituting the multilayer film to the glass transition temperature+100° C.

After subjecting the thus obtained uniaxially stretched film to a surface treatment such as corona treatment, flame treatment or plasma treatment as required, a function(s) such as lubricity, adhesiveness and/or antistatic property may also be imparted to the film by in-line coating.

Particularly, the multilayer film is often used for producing a laminated glass to be used as a window glass of a vehicle or building and, in that case, it is also preferred that adhesive be imparted to the multilayer film to improve its adhesion with an interlayer. Coating for imparting adhesiveness is preferably performed on both sides of the multilayer film.

In addition, it is also preferred that the coating for imparting adhesiveness contain a colored component. By incorporating a colored component in the coating for imparting adhesiveness, it becomes possible to form a colored layer and invest adhesiveness simultaneously and a colored component can be incorporated into the resulting film by the same production steps as those used for producing a multilayer film containing no colored component. Therefore, it is advantageous also from the cost standpoint.

The term "stretching in the transverse direction" refers to stretching for imparting an orientation to a film in the transverse direction and usually, using a tenter, a film is conveyed with both ends being held by clips so as to be stretched in the transverse direction. The stretching ratio varies depending on the resin type; however, usually, it is preferably 2 to 15 times. When polyethylene terephthalate is used as one of the resins constituting the multilayer film, the stretching ratio is particularly preferably 2 to 7 times.

Further, it is preferred that the stretching temperature be in the range of the glass transition temperature of a resin constituting the multilayer film to the glass transition temperature+120° C.

The thus obtained biaxially stretched film is preferably subjected to a heat treatment in a tenter at a temperature of not lower than the stretching temperature but not higher than the melting point so as to be imparted with flatness and dimensional stability. After being heat-treated in this manner, the resulting film is uniformly and slowly cooled and then further cooled to room temperature to be rolled up. In addition, as required, a relaxation treatment or the like may also be performed in combination in the period between the heat treatment and the slow cooling.

The temperature at which the heat treatment is performed is preferably lower than the melting point of either of the thermoplastic resins A and B but higher than the melting point of the other. In this case, one of the thermoplastic resins can be melted using the other thermoplastic resin as a support and the difference between the refractive index of the thermoplastic resin having a high degree of crystal orientation and that of the molten thermoplastic resin can be increased; therefore, a multilayer film having a high reflectance and heat-shielding performance can be obtained. Further, if a thermoplastic resin containing a colored component can be melted by the heat treatment, formation of voids and the like can be inhibited, so that a film having a reduced haze and a high transparency can be obtained as well.

Next, the case of employing simultaneous biaxial stretching will be described. When the thus obtained cast film is subjected to simultaneous biaxial stretching, after subjecting the film to a surface treatment such as corona treatment, flame treatment or plasma treatment as required, a function(s) such as lubricity, adhesiveness and/or antistatic property may also be imparted to the film by in-line coating.

Then, the resulting cast film is introduced to a simultaneous biaxial tenter and conveyed with both ends being held by clips so as to be stretched in the machine and transverse directions simultaneously and/or stepwisely. Examples of a simultaneous biaxial stretching machine include a pantograph-type, a screw-type, a drive motor-type and a linear motor-type stretching machines, among which preferred are a drive motor-type and a linear motor-type stretching machines in which the stretching ratio can be arbitrarily changed and relaxation treatment can be carried out at any location. The stretching ratio varies depending on the resin type; however, usually, it is preferably 6 to 50 times in terms of area ratio. When polyethylene terephthalate is used as one of the resins constituting the multilayer film, the stretching ratio is particularly preferably 8 to 30 times in terms of area ratio. Particularly, in simultaneous biaxial stretching, to reduce a difference in the in-plane orientation, it is preferred that the stretching ratios in the machine and transverse directions be the same and the stretching rates in these directions be also almost the same. Further, it is preferred that the stretching temperature be in the range of the glass transition temperature of a resin constituting the multilayer film to the glass transition temperature+120° C.

It is preferred that the thus obtained biaxially stretched film is continuously subjected to a heat treatment in the tenter at a temperature of not lower than the stretching temperature but not higher than the melting point to be imparted with flatness and dimensional stability. In this heat treatment, to inhibit inconsistent distribution along the main orientation axis in the transverse direction, it is preferred to perform a relaxation treatment instantly in the machine direction immediately before and/or after the film enters the heat treatment zone. After being heat-treated in this manner, the resulting film is uniformly and slowly cooled and then further cooled to room temperature to be rolled up. In addition, as required, a relaxation treatment may also be performed in the machine direction and/or transverse direction in the period between the heat treatment and the slow cooling. The relaxation treatment is performed instantly in the machine direction immediately before and/or after the film enters the heat treatment zone.

Particularly, in the multilayer film, to reduce heat shrinkage, it is preferred to perform, as post-heat treatment relaxation processes, a first relaxation treatment at the heat treatment temperature and a second relaxation treatment at a temperature of not higher than 100° C. In this case, the tension state of the film can be effectively relaxed without imposing a profound effect on the optical characteristics and, in particular, heat shrinkage at a temperature of 150° C. or lower can be suppressed. Preferably, the first relaxation treatment relaxes the film by 5% or less and the first and the second relaxation treatments collectively relax the film by a total of 10% or less. In this case, heat shrinkage can be reduced without causing unwanted wrinkling and slackening while maintaining the optical characteristics.

Further, a colored layer containing a colored component on the obtained multilayer film can also be arranged by employing a thermosetting coating method, a photocuring coating method or a printing method. The method thereof is not particularly restricted and any existing method can be employed.

Next, one example of the step of producing a laminated glass using the thus obtained multilayer film will be described below. Cut laminated glasses having a size suitable for a glass were prepared and, on one of the thus prepared glasses, a resin film used as an interlayer, which is represented by polyvinyl butyral, ethylene-vinyl acetate copolymer resin or the like, a cut multilayer film, a resin film and the other glass were arranged and then preliminary press-bonded by heating in a 120° C. atmosphere for about 1 hour. Subsequently, the resultant is heated to 140° C. under a pressure of 1.5 MPa and maintained in this condition for 30 minutes, thereby subjecting the resultant to final bonding to obtain a laminated glass.

The thus obtained laminated glass has a high transparency, exhibits a stable color tone regardless of an angle to its film or glass surface and shows excellent heat ray-cutting property; therefore, it is suitable particularly as a heat ray-cutting glass used in an automobile, train, building or the like.

EXAMPLES

The multilayer film will now be described by way of examples thereof. Method of Evaluating Physical Properties and Method of Evaluating Effects The physical property values and the effects were evaluated by the following methods.
(1) Layer Thickness, Number of Laminated Layers, Laminate Structure The layer constitution of a film was determined by observing a cross-section of a sample, which was cut-exposed using a microtome, under a transmission electron microscope (TEM). That is, a cross-section of a film was observed under a transmission electron microscope (model H-7100FA, manufactured by Hitachi, Ltd.) at a magnification of ×10,000 to ×40,000 under an accelerating voltage of 75 kV and a photograph of the cross-section was taken to determine the layer constitution and measure the thickness of each layer. It is noted here that, in some cases, a staining technique using $RuO_4$, $OsO_4$ or the like was employed to attain a high contrast.

(2) Method of Calculating Layer Thickness

The TEM image taken at a magnification of about ×40,000 in the above (1) was captured as a 720-dpi image using CanonScan D123U. The image was saved in a personal computer as a bitmap file (BMP) or a compressed image file (JPEG). Then, this image file was opened with an image processing software (Image-Pro Plus ver. 4, commercially available from Planetron Co., Ltd.) and subjected to image analysis. For this image analysis, in the vertical thick profile mode, the relationship between a position in the thickness direction and the average brightness of a region between two lines drawn in the transverse direction was read out as numerical data. Then, using a spreadsheet software (Excel 2000), after subjecting the thus obtained data of position (nm) and brightness to the sampling step 6 (pixel skipping 6), the resulting data were further subjected to numerical processing of three-point moving average. Further, the thus obtained data in which the brightness changes periodically was differentiated. Using VBA (Visual Basic for Applications) program, the maximum and minimum values of the resulting differential curve were identified and the thickness of each layer was calculated taking an interval between adjacent values as the thickness of a single layer. These operations were performed for each image to calculate the thicknesses of all layers. Among those layers whose thickness was determined, ones having a thickness of 1 μm or greater were defined as thick-film layers. Also, a thin-film layer was defined as a layer of 500 nm or less in thickness.

(3) Measurement of Reflectance and Transmittance

A spectrophotometer (U-4100 Spectrophotometer, manufactured by Hitachi, Ltd.) was fitted with a 12° specular reflection attachment, P/N134-0104, and the absolute transmittance and the reflectance in a wavelength range of 250 to 2,600 nm were measured at an incident angle ($\phi$) of 12°. As for the measurement conditions, a slit of 2 nm (visible)/automatic control (infrared) was used; the gain was set at 2; and the scanning rate was 600 nm/min. A sample having a size of 5 cm×5 cm was cut out from the central portion of the subject film in the transverse direction and then subjected to the measurement. From the results of the measurement, the average and maximum transmittance and the reflectance in the respective specific wavelength bandwidths shown in Table 1 were determined. Further, using the thus obtained reflectance and transmittance values, the solar reflectance and visible light transmittance were determined in accordance with the methods prescribed in JIS A5759 6.3.3 and 6.3.5.

(4) Calculation of C* Value, a* Value and b* Value

A spectrophotometer (U-4100 Spectrophotometer, manufactured by Hitachi, Ltd.) was fitted with a variable-angle permeation attachment and the absolute transmittance in a wavelength range of 250 to 2,600 nm was measured at an incident angle ($\phi$) of 45°. As for the measurement conditions, a slit of 2 nm (visible)/automatic control (infrared) was used; the gain was set at 2; and the scanning rate was 600 nm/min. A sample having a size of 5 cm×10 cm was cut out from the central portion of the subject film in the transverse direction and then subjected to the measurement. Using the thus obtained transmittance value at an angle of 45° and the transmittance value measured at an angle of 12° in the above (3) as well as the spectral distribution of the light source C and the XYZ color matching functions, the XYZ values were calculated, and then, the C*, a* and b* values were calculated by using the calculated XYZ values.

For the thus obtained a* values and b* values, the difference between the value at an angle of 12° and the value at an angle of 45° was defined as Δa* value and Δb* value, respectively.

(5) Refractive Indices of Thermoplastic Resins A and B

The refractive indices of the thermoplastic resins A and B were measured in accordance with JIS K7142(1996)A.

(6) Heat Shrinkage

From the central portion of the subject film in the transverse direction, a sample of 150 mm in the machine direction×10 mm in the transverse direction was cut out. This sample piece was left to stand for 30 minutes in an atmosphere of 23° C. and 60% RH. Then, in this atmosphere, two marks were made on the sample piece at an interval of about 100 mm in the film machine direction and the distance between the two marks was measured using a universal projector (Model V-16A, manufactured by Nikon Corporation). The thus obtained value was defined as "A". Next, the sample was left to stand for 30 minutes in a 150° C. atmosphere with 3-g load being applied thereto. Then, after cooling the resulting sample for 1 hour in an atmosphere of 23° C. and 60% RH and adjusting the humidity, the distance between the two marks that were previously made was measured and defined as "B". Thereafter, the heat shrinkage was determined using the Formula (8) below. For each of the film machine direction (MD) and transverse direction (TD), the number of measurements (n) was 3, and the average of the three measurements was taken as the heat shrinkage of the subject film.

$$\text{Heat shrinkage (\%)}=100\times(A-B)/A \tag{8}$$

(7) 5% Stress

The 5% stress was measured using an Instron-type tensile tester in accordance with the method prescribed in JIS-K7127 (1999). It is noted here that, as the elongation value, a higher value in either the machine direction or the transverse direction was employed. The measurement conditions were as follows.

Measuring apparatus: automatic film strength and elongation tester "TENSILON AMF/RTA-100"; manufactured by Orientec Co., Ltd.

Sample size: 10 mm in width×50 mm in gauge length

Tensile rate: 300 mm/min

Measurement environment: temperature=100° C.

(8) Internal Haze

A sample having a size of 4 cm×3.5 cm was cut out from the central portion of the subject film in the transverse direction. As a measuring apparatus, a haze meter (HGM-2DP (for light source C), manufactured by Suga Test Instruments Co., Ltd.) was employed. The sample was placed in a quartz cell and measured in a state of being immersed in 1,2,3,4-tetrahydronaphthalene (tetralin). The thus obtained value was calibrated only with the solution and the quartz cell.

(9) Melting Point of Thermoplastic Resin

Using EXSTAR DSC6220 manufactured by Seiko Instruments Inc., the melting point of each thermoplastic resin was determined in accordance with JIS-K7121-1987. The measurement conditions were as follows. A subject thermoplastic resin was weighed in an amount of 5 mg using an electric balance and inserted into an aluminum packing to prepare a sample. The thus obtained sample was heated from 25° C. to 300° C. at a rate of 20° C./min using SC6220.

Example 1

As two kinds of thermoplastic resins having different optical properties, thermoplastic resins A and B were prepared. As the thermoplastic resin A, polyethylene terephthalate (PET) having an intrinsic viscosity of 0.65 was employed. This resin A was a crystalline resin and had an in-plane average refractive index of 1.66 and a melting point of 256° C. when made into a film. As the thermoplastic resin B, ethylene terephthalate copolymerized with 25% by mol of spiroglycol and 30% by mol of cyclohexanedicarboxylic acid (PE/SPG•T/CHDC) was employed. This resin B was a noncrystalline resin having an intrinsic viscosity of 0.72 and, when made into a film, had an in-plane average refractive index of 1.55. Further, as a colored component, Lumogen IR 788 manufactured by BASF Co., Ltd. (colored component 1) was kneaded into the thermoplastic resin B at a ratio of 0.2% by weight using a biaxial extruder, thereby preparing a pellet. It is noted that the colored component 1 used here was in a molten state at 300° C. and its average transmittances in wavelength ranges of 400 to 450 nm and 600 to 800 nm were both lower than the average transmittance in a wavelength range of 450 to 600 nm. The thus prepared thermoplastic resins A and B were loaded to two separate uniaxial extruders and melt-kneaded at 280° C. Subsequently, the resulting resins A and B were each passed through five FSS-type leaf disk filters. Thereafter, while measuring the amounts of the resins A and B using a gear pump such that the ratio of their optical thicknesses (thermoplastic resin A/thermoplastic resin B) excluding the thick-film layers became 1, the resins A and B were converged in a 601-layer laminating apparatus constituted by three slit plates each having 201 slits, thereby obtaining a 601-layer multilayer film in which the resins A and B were alternately laminated in the thickness direction. This laminate production was carried out in accordance with the method described in the paragraphs [0053] to [0056] of JP-A No. 2007-307893. It is noted here that the number of intervals in each slit plate was 603 because of the presence of layers that were formed by laminating layer As with each other. The lengths of the slits were all the same and the layer thickness distribution was allowed to have an inclined structure by changing only the slit intervals. The thus obtained laminate contained 301 layers of the thermoplastic resin A and 300 layers of the thermoplastic resin B and had an inclined structure in which these two types of layers were alternately laminated in the thickness direction. The intended layer thickness distribution pattern determined based on the intervals of the slit plates of the multi-layer laminating apparatus is shown in FIG. 2. Further, the slit intervals were adjusted such that thick-film layers were 20 times thicker than its adjacent layers. Moreover, the width-enlarging ratio in the die, which is a value obtained by dividing the length of the die lip in the film transverse direction 17 by the length of the inlet part of the die in the film transverse direction 15, was set to be 2.5.

The thus obtained cast film was heated with a group of rolls whose temperature was set at 75° C. Then, in a stretching section of 100 mm in length, while rapidly heating the film from both sides using a radiation heater, the film was stretched in the longitudinal direction at a draw ratio of 3.3 and subsequently cooled once. Thereafter, both sides of the resulting uniaxially-stretched film were subjected to corona discharge treatment in the air so as to adjust the wetting tension of the base film to be 55 mN/m. Then, a multilayer-forming film-coating solution, which is composed of a polyester resin having a glass transition temperature of 18° C., a polyester resin having a glass transition temperature of 82° C. and silica particles having an average particle size of 100 nm, was coated onto the thus treated surfaces, thereby forming transparent, lubricating and adhesion-promoting layers.

This uniaxially-stretched film was introduced to a tenter and, after pre-heating the film with hot air at 100° C., the film was stretched at a temperature of 110° C. and a draw ratio of 3.5 in the lateral direction. The thus stretched film was heat-treated with hot air at 240° C. in the same tenter and then subjected to a 2% relaxation treatment in the transverse direction at the same temperature. Further, after rapidly cooling the resulting film to 100° C., the film was subjected to a 5% relaxation treatment in the transverse direction and then rolled up to obtain a rolled multilayer film. The thus obtained multilayer film had a main reflection bandwidth in a wavelength range of 800 to 1,100 nm.

Further, a multilayer film having a main reflection bandwidth in a wavelength range of 1,100 to 1,400 nm was obtained in the same manner as described above. The thus obtained two films were dry-laminated via an adhesive layer, which was formed by coating a urethane-based adhesive at a thickness of 7 μm using a die-type dry laminator, thereby preparing a single multilayer film. The thus obtained multilayer film had a main reflection bandwidth in a wavelength range of 800 to 1,400 nm and a third-order reflection bandwidth in a wavelength range of 300 to 470 nm. In addition, the multilayer film showed prominent absorption for lights having a wavelength of 600 to 800 nm. Moreover, in addition to having a high and wide reflection bandwidth in the near-infrared region and showing high heat ray-reflecting performance, the multilayer film had a relatively small difference in the color tone between a light transmitted at an angle of 12° and a light transmitted at an angle of 45°. These results are shown in Table 1.

The thus obtained multilayer film had corrected average transmittances of 97%, 88% and 54% in wavelength ranges of 450 to 600 nm, 400 to 450 nm and 600 to 800 nm, respectively.

Example 2

A multilayer film was obtained in the same manner as in Example 1, except that a 401-layer laminating apparatus constituted by two slit plates each having 201 slits was used as a multi-layer laminating apparatus. The thus obtained multilayer film had a main reflection bandwidth in a wavelength range of 800 to 1,400 nm and a third-order reflection bandwidth in a wavelength range of 300 to 470 nm. In addition, the multilayer film showed prominent absorption for lights having a wavelength of 600 to 800 nm. The reflectance of this multilayer film was lower than that of Example 1 and the heat ray-shielding performance was reduced. Moreover, the difference in the color tone between a light transmitted at an angle of 12° and a light transmitted at an angle of 45° was also small. These results are shown in Table 1.

Example 3

A multilayer film was obtained in the same manner as in Example 1, except that polyethylene terephthalate produced by copolymerizing 70% by mol of ethylene glycol with 30% by mol of cyclohexane dimethanol (CHDM-copolymerized PET; PETG GN001, manufactured by Eastman Chemical Company) was used as the thermoplastic resin B and that a pellet in which 0.2% by weight of the colored component 1 was kneaded in this thermoplastic resin B was used. The CHDM-copolymerized PET used here was a noncrystalline resin and had an in-plane average refractive index of 1.575 when made into a film. The thus obtained multilayer film had a main reflection bandwidth in a wavelength range of 800 to 1,400 nm and a third-order reflection bandwidth in a wavelength range of 300 to 470 nm. In addition, the multilayer film showed prominent absorption for lights having a wavelength of 600 to 800 nm. The reflectance and the heat ray-shielding performance of this multilayer film were both lower than those of Example 1 but higher than those of Example 2. Moreover, the difference in the color tone between a light transmitted at an angle of 12° and a light transmitted at an angle of 45° was small. These results are shown in Table 1.

Example 4

A multilayer film was obtained in the same manner as in Example 1, except that the film thickness was adjusted such that the multilayer film had a main reflection bandwidth in a wavelength range of 800 to 1,200 nm. The thus obtained multilayer film had a main reflection bandwidth in a wavelength range of 800 to 1,200 nm, but did not have any reflection bandwidth in a wavelength range of 400 to 800 nm. Moreover, the multilayer film showed prominent absorption for lights having a wavelength of 600 to 800 nm. As compared to Example 1, this multilayer film had a slightly narrower reflection bandwidth in the near-infrared region; however, by having an absorption bandwidth in a wavelength range of 600 to 800 nm, in addition to showing high heat ray-shielding performance, the multilayer film had a relatively small difference in the color tone between a light transmitted at an angle of 12° and a light transmitted at an angle of 45°. These results are shown in Table 1.

Example 5

A multilayer film was obtained in the same manner as in Example 1, except that the content of the colored component 1 was changed to 0.1% by weight. The thus obtained multilayer film had a main reflection bandwidth in a wavelength range of 800 to 1,200 nm, but did not have any reflection bandwidth in a wavelength range of 400 to 800 nm. Further, although the multilayer film showed prominent absorption for lights having a wavelength of 600 to 800 nm, the transmittance was higher than that of Example 4 and the heat ray-shielding performance was slightly reduced. Moreover, the difference in the color tone between a light transmitted at an angle of 12° and a light transmitted at an angle of 45° was also relatively small. These results are shown in Table 1.

Example 6

A multilayer film was obtained in the same manner as in Example 1, except that the thermoplastic resin B contained no colored component. Then, on one side of the thus obtained multilayer film, a 5 µm-thick colored layer composed of an acrylic resin (IRG-205, manufactured by Nippon Shokubai Co., Ltd.) which was noncrystalline and contained 2% by weight of the colored component 1 was formed by coating. The resulting multilayer film had a main reflection bandwidth in a wavelength range of 800 to 1,400 nm and a third-order reflection bandwidth in a wavelength range of 300 to 470 nm or. In addition, the multilayer film showed prominent absorption for lights having a wavelength of 600 to 800 nm. By having a high and wide reflection bandwidth in the near-infrared region along with an absorption bandwidth in a wavelength range of 600 to 800 nm, this multilayer film not only showed high heat ray-reflecting performance, but also had a relatively small difference in the color tone between a light transmitted at an angle of 12° and a light transmitted at an angle of 45°. Moreover, its transparency was higher than that of Example 1. These results are shown in Table 1.

Example 7

A multilayer film was obtained in the same manner as in Example 1, except that the thermoplastic resin B contained no colored component. Then, on one side of the thus obtained multilayer film, a 5 µm-thick colored layer composed of an acrylic resin (IRG-205, manufactured by Nippon Shokubai Co., Ltd.) containing 2% by weight of YELLOW 2G (colored component 2; manufactured by Nippon Kayaku Co., Ltd.) was formed by coating. It is noted that the colored component 2 used here was in a molten state at 300° C.; and that its average transmittance in a wavelength range of 400 to 450 nm was lower than that in a wavelength range of 450 to 600 nm, but the average transmittance in a wavelength range of wavelength of 600 to 800 nm was higher than that in a wavelength range of 450 to 600 nm. The thus obtained multilayer film had a main reflection bandwidth in a wavelength range of 800 to 1,400 nm and a third-order reflection bandwidth in a wavelength range of 300 to 470 nm. Further, the multilayer film showed prominent absorption for lights having a wavelength of 400 to 450 nm. By having a high and wide reflection bandwidth in the near-infrared region along with an absorption bandwidth in a wavelength range of 400 to 450 nm, this multilayer film showed high heat ray-reflecting performance. Moreover, a difference in the color tone between a light transmitted at an angle of 12° and a light transmitted at an angle of 45° was hardly observed. This multilayer film had a higher visible light transmittance as compared to Example 1 and showed a slight yellow coloration. These results are shown in Table 1.

The thus obtained multilayer film had corrected average transmittances of 89%, 22% and 99% in wavelength ranges of 450 to 600 nm, 400 to 450 nm and 600 to 800 nm, respectively.

Example 8

A multilayer film was obtained in the same manner as in Example 1, except that L-50 (colored component 3; manufactured by DIC Corporation) was kneaded in an amount of 4 wt % into the thermoplastic resin B. It is noted here that the colored component 3 used here was not completely in a molten state at 310° C.; and that its average transmittance in a wavelength range of 400 to 450 nm was higher than that in a wavelength range of 450 to 600 nm, but the average transmittance in a wavelength range of wavelength of 600 to 800 nm was lower than that in a wavelength range of 450 to 600 nm. The thus obtained multilayer film had a main reflection bandwidth in a wavelength range of 800 to 1,400 nm and a third-order reflection bandwidth in a wavelength range of 300 to 470 nm. Further, the multilayer film showed prominent absorption for lights having a wavelength of 550 to 800 nm. By having a high and wide reflection bandwidth in the near-infrared region along with an absorption bandwidth in a wavelength range of 550 to 800 nm, this multilayer film showed high heat ray-reflecting performance. Moreover, a difference in the color tone between a light transmitted at an angle of 12° and a light transmitted at an angle of 45° was hardly observed; however, this multilayer film had a relatively low visible light transmittance. These results are shown in Table 1.

The thus obtained multilayer film had corrected average transmittances of 87%, 92% and 69% in wavelength ranges of 450 to 600 nm, 400 to 450 nm and 600 to 800 nm, respectively.

Example 9

A multilayer film was obtained in the same manner as in Example 1, except that the thermoplastic resin B contained no colored component. Then, on one side of the thus obtained multilayer film, a 5 μm-thick colored layer A composed of an acrylic resin (IRG-205, manufactured by Nippon Shokubai Co., Ltd.) containing 2% by weight of the colored component 1 was formed by coating and, on the other side of the multilayer film, a 5 μm-thick colored layer B composed of an acrylic resin (IRG-205, manufactured by Nippon Shokubai Co., Ltd.) containing 2% by weight of the colored component 2 was also formed by coating. The resulting multilayer film had a main reflection bandwidth in a wavelength range of 800 to 1,400 nm along with a third-order reflection bandwidth in a wavelength range of 300 to 470 nm. Further, the multilayer film showed prominent absorption for lights having a wavelength of 400 to 450 nm or 600 to 800 nm. By having a high and wide reflection bandwidth in the near-infrared region along with absorption bandwidths in wavelength ranges of 400 to 450 nm and 600 to 800 nm, this multilayer film showed high heat ray-reflecting performance. Moreover, a difference in the color tone was hardly observed not only between a light transmitted at an angle of 12° and a light transmitted at an angle of 45°, but also for reflected lights. These results are shown in Table 1. Furthermore, the absorption rates of the colored layers A and B at wavelengths of 450 nm and 700 nm were found to be as follows.

AbsA(450): 5%
AbsB(450): 58%
AbsA(700): 66%
AbsB(700): 0%

Example 10

A 1,202-layer multilayer film having a reflection bandwidth in a wavelength range of 800 to 1,400 nm was obtained in the same manner as in Example 1 (component Ln). Further, using a resin mixture obtained by kneading a thermoplastic resin A, which was the PET resin shown in Example 1, and a thermoplastic resin B, which was the CHDM-copolymerized PET shown in Example 3, at a ratio of 1:1, a 1,202-layer multilayer film having a reflection bandwidth in a wavelength range of 400 to 800 nm was also obtained in the same manner as in Example 1 (component Lv). The resin mixture of the CHDM-copolymerized PET and the PET resin that was used here had an in-plane average refractive index of 1.610 when made into a film. These two laminates were dry-laminated in the same manner as in Example 1, thereby obtaining a multilayer film having 2,404 layers. The thus obtained multilayer film had a main reflection bandwidth in a wavelength range of 800 to 1,400 nm, where strong reflection was exhibited; a weak and uniform reflection in a wavelength range of 400 to 800 nm; and a third-order reflection bandwidth in a wavelength range of 300 to 470 nm. Moreover, this multilayer film showed prominent absorption for lights having a wavelength of 600 to 800 nm. By having a high and wide reflection bandwidth in the near-infrared region along with a uniform reflection in the visible wavelength region, this multilayer film showed high heat ray-reflecting performance. In addition, this multilayer film had a relatively small difference in the color tone between a light transmitted at an angle of 12° and a light transmitted at an angle of 45°. These results are shown in Table 1.

Example 11

A 1,202-layer multilayer film having a reflection bandwidth in a wavelength range of 800 to 1,400 nm was obtained in the same manner as in Example 1 (component Ln). Further, using a 601-layer laminating apparatus constituted by three slit plates each having 201 slits, which was designed to yield a layer thickness distribution different from the one produced by the multi-layer laminating apparatus used to prepare the component (Ln), and a thermoplastic resin containing no colored component, a 601-layer multilayer film having a reflection bandwidth in a wavelength range of 400 to 800 nm (component Lv) was obtained in the same manner as in Example 1. These two laminates were dry-laminated in the same manner as in Example 1, thereby obtaining a multilayer film having 1,803 layers. The thus obtained multilayer film had a main reflection bandwidth in a wavelength range of 800 to 1,400 nm, where strong reflection was exhibited; a weak and uniform reflection in a wavelength range of 400 to 800 nm; and a third-order reflection bandwidth in a wavelength range of 300 to 470 nm. Moreover, this multilayer film showed prominent absorption for lights having a wavelength of 600 to 800 nm. By having a high and wide reflection bandwidth in the near-infrared region along with a uniform reflection in the visible wavelength region, this multilayer film showed high heat ray-reflecting performance. In addition, this multilayer film had a relatively small difference in the color tone between a light transmitted at an angle of 12° and a light transmitted at an angle of 45°. These results are shown in Table 1.

Example 12

A multilayer film was obtained in the same manner as in Example 1, except that the thermoplastic resin A contained the colored component 1 in an amount of 0.2% by weight and that the thermoplastic resin B contained no colored component. The thus obtained multilayer film had a main reflection bandwidth in a wavelength range of 800 to 1,400 nm and a third-order reflection bandwidth in a wavelength range of 300 to 470 nm or shorter. Moreover, this multilayer film showed prominent absorption for lights having a wavelength of 600 to 800 nm. In addition to having a high and wide reflection bandwidth in the near-infrared region and showing high heat ray-shielding performance, this multilayer film had a relatively small difference in the color tone between a light transmitted at an angle of 12° and a light transmitted at an angle of 45°. Meanwhile, the internal haze was 0.4% in Example 1; however, it was increased to 4.0% in this multilayer film of Example 12 and the transparency was slightly lower. These results are shown in Table 1.

Example 13

A 601-layer multilayer film having a reflection bandwidth in a wavelength range of 800 to 1,200 nm was obtained in the same manner as in Example 1, except that a pigment master (TYL, colored component 4; manufactured by Dainichiseika Color and Chemicals Mfg. Co., Ltd.) was kneaded in an amount of 2.0% by weight into the thermoplastic resin B. It is noted here, however, that resulting two multilayer films were not dry-laminated in this Example 13. Further, the colored component 4 used here was in a molten state at 300° C. and its average transmittance in a wavelength range of 400 to 450 nm was lower than that in a wavelength range of 450 to 600 nm, but the average transmittance in a wavelength range of wavelength of 600 to 800 nm was higher than that in a wavelength range of 450 to 600 nm. The thus obtained multilayer film had a main reflection bandwidth in a wavelength range of 800 to 1,200 nm, but did not have any reflection bandwidth in a wavelength range of 400 to 800 nm. Further, this multilayer film also showed absorption for lights having a wavelength of 400 to 450 nm. By having an absorption bandwidth in a wavelength range of 400 to 450 nm, as compared to the multilayer film of Comparative Example 4, this multilayer film of Example 13 had an improved heat ray-shielding performance and a smaller difference in the color tone between a light transmitted at an angle of 12° and a light transmitted at an angle of 45°. These results are shown in Table 1.

The thus obtained multilayer film had corrected average transmittances of 88%, 65% and 99% in wavelength ranges of 450 to 600 nm, 400 to 450 nm and 600 to 800 nm, respectively.

Example 14

A 601-layer multilayer film having a reflection bandwidth in a wavelength range of 800 to 1,200 nm was obtained in the same manner as in Example 13, except that the content of the colored component 4 was changed to 8.0% by weight. The thus obtained multilayer film had a main reflection bandwidth in a wavelength range of 800 to 1,200 nm, but did not have any reflection bandwidth in a wavelength range of 400 to 800 nm. Further, this multilayer film also showed prominent absorption for lights having a wavelength of 400 to 450 nm. As compared to the multilayer film of Example 13, this multilayer film had a further improved heat ray-shielding performance. However, yellow coloration was noticeable. Moreover, this multilayer film had a relatively small difference in the color tone between a light transmitted at an angle of 12° and a light transmitted at an angle of 45°. These results are shown in Table 1.

Example 15

A 601-layer multilayer film having a reflection bandwidth in a wavelength range of 800 to 1,200 nm was obtained in the same manner as in Example 13, except that a pigment master (TGL, colored component 5; manufactured by Dainichiseika Color and Chemicals Mfg. Co., Ltd.) was kneaded in an amount of 3.0% by weight into the thermoplastic resin B. The colored component 5 used here was in a molten state at 300° C. and its average transmittance in a wavelength range of 400 to 450 nm is the same as that in a wavelength range of 450 to 600 nm, but the average transmittance in a wavelength range of wavelength of 600 to 800 nm was lower than that in a wavelength range of 450 to 600 nm. The thus obtained multilayer film had a main reflection bandwidth in a wavelength range of 800 to 1,200 nm, but did not have any reflection bandwidth in a wavelength range of 400 to 800 nm. Further, this multilayer film also showed absorption for lights having a wavelength of 600 to 800 nm. By having an absorption bandwidth in a wavelength range of 600 to 800 nm, as compared to the multilayer film of Comparative Example 4, this multilayer film of Example 15 had an improved heat ray-shielding performance and a smaller difference in the color tone between a light transmitted at an angle of 12° and a light transmitted at an angle of 45°. These results are shown in Table 1.

The thus obtained multilayer film had corrected average transmittances of 99%, 99% and 88% in wavelength ranges of 450 to 600 nm, 400 to 450 nm and 600 to 800 nm, respectively.

Example 16

A 601-layer multilayer film having a reflection bandwidth in a wavelength range of 800 to 1,200 nm was obtained in the same manner as in Example 15, except that the content of the colored component 4 was changed to 13.0% by weight. The thus obtained multilayer film had a main reflection bandwidth in a wavelength range of 800 to 1,200 nm, but did not have any reflection bandwidth in a wavelength range of 400 to 800 nm. Further, this multilayer film also showed absorption for lights having a wavelength of 600 to 800 nm. As compared to the multilayer film of Example 15, this multilayer film had a further improved heat ray-shielding performance and, although it was slightly colored in blue, the color itself was weak. Moreover, this multilayer film had a relatively small difference in the color tone between a light transmitted at an angle of 12° and a light transmitted at an angle of 45°. These results are shown in Table 1.

Example 17

A 601-layer multilayer film having a reflection bandwidth in a wavelength range of 800 to 1,200 nm was obtained in the same manner as in Example 13, except that, as colored components, the colored components 4 and 5 were used in amounts of 5% by weight and 3% by weight, respectively. The thus obtained multilayer film had a main reflection bandwidth in a wavelength range of 800 to 1,200 nm, but did not have any reflection bandwidth in a wavelength range of 400 to 800 nm. Further, this multilayer film also showed prominent absorption for lights having a wavelength of 400 to 450 nm or 600 to 800 nm. As compared to the multilayer film of Comparative Example 4, this multilayer film had a further improved heat ray-shielding performance and, although it was slightly colored in green, the color itself was weak. Moreover, this multilayer film had a relatively small difference in the color tone between a light transmitted at an angle of 12° and a light transmitted at an angle of 45°. These results are shown in Table 1.

Example 18

A 1,201-layer multilayer film having a reflection bandwidth in a wavelength range of 800 to 1,400 nm was obtained in the same manner as in Example 1, except that, as colored components, the colored components 4 and 5 were used in amounts of 5% by weight and 3% by weight, respectively. The thus obtained film had a main reflection bandwidth in a wavelength range of 800 to 1,400 nm; however, the reflectance in a wavelength range of 400 to 800 nm was sufficiently small. Further, this multilayer film also showed prominent absorption for lights having a wavelength of 400 to 450 nm or 600 to 800 nm. As compared to the multilayer film of Example 1, this multilayer film had a further improved heat ray-shielding performance and, although it was slightly colored in green, the color itself was weak. Particularly, the color tones of reflected lights were substantially achromatic and there was no change in the color tone. Moreover, this multilayer film of Example 18 had a relatively small difference in the color tone between a light transmitted at an angle of 12° and a light transmitted at an angle of 45°. These results are shown in Table 1.

Example 19

A 1,201-layer multilayer film having a reflection bandwidth in a wavelength range of 800 to 1,400 nm was obtained in the same manner as in Example 1, except that, as colored components, the colored components 4 and 5 were used in amounts of 3% by weight and 5% by weight, respectively. The thus obtained film had a main reflection bandwidth in a wavelength range of 800 to 1,400 nm. However, the reflectance in a wavelength range of 400 to 800 nm was sufficiently small. Further, this multilayer film also showed prominent absorption for lights having a wavelength of 400 to 450 nm or 600 to 800 nm. As compared to the multilayer film of Example 1, this multilayer film had a further improved heat ray-shielding performance and, although it was slightly colored in green, the color itself was weak. Particularly, the color tones of reflected lights were substantially achromatic and, although this multilayer film showed a larger change in the color tone than the multilayer film of Example 18 did, the change in the color tone was smaller as compared to the change observed in Example 1. Moreover, this multilayer film of Example 19 had a relatively small difference in the color tone between a light transmitted at an angle of 12° and a light transmitted at an angle of 45°. These results are shown in Table 1.

Example 20

A 801-layer multilayer film having a reflection bandwidth in a wavelength range of 800 to 1,400 nm was obtained in the same manner as in Example 2, except that, as colored components, the colored components 4 and 5 were used in amounts of 5% by weight and 3% by weight, respectively. The thus obtained film had a main reflection bandwidth in a wavelength range of 800 to 1,400 nm. However, the reflectance in a wavelength range of 400 to 800 nm was sufficiently small. Further, this multilayer film also showed prominent absorption for lights having a wavelength of 400 to 450 nm or 600 to 800 nm. As compared to the multilayer film of Example 2, this multilayer film had a further improved heat ray-shielding performance and, although it was slightly colored in green, the color itself was weak. Particularly, the color tones of reflected lights were substantially achromatic and there was no change in the color tone. Moreover, this multilayer film of Example 20 had a relatively small difference in the color tone between a light transmitted at an angle of 12° and a light transmitted at an angle of 45°. These results are shown in Table 1.

Example 21

A 601-layer multilayer film having a reflection bandwidth in a wavelength range of 800 to 1,200 nm was obtained in the same manner as in Example 13, except that a color master (EMBPET, colored component 6; manufactured by Sumika Color Co., Ltd.) was kneaded in an amount of 4.0% by weight into the thermoplastic resin B. Further, the colored component 6 used here was in a molten state at 300° C. and its average transmittance in a wavelength range of 400 to 450 nm was higher than that in a wavelength range of 450 to 600 nm, but the average transmittance in a wavelength range of 600 to 800 nm was lower than that in a wavelength range of 450 to 600 nm. The thus obtained multilayer film had a main reflection bandwidth in a wavelength range of 800 to 1,200 nm, but did not have any reflection bandwidth in a wavelength range of 400 to 800 nm. Further, this multilayer film also showed prominent absorption for lights having a wavelength of 600 to 800 nm. By having an absorption bandwidth in a wavelength range of 600 to 800 nm, as compared to the multilayer film of Comparative Example 4, this multilayer film of Example 21 had an improved heat ray-shielding performance and a smaller difference in the color tone between a light transmitted at an angle of 12° and a light transmitted at an angle of 45°. These results are shown in Table 1.

The thus obtained multilayer film had corrected average transmittances of 94%, 84% and 67% in wavelength ranges of 450 to 600 nm, 400 to 450 nm and 600 to 800 nm, respectively.

Comparative Example 1

A cast film was obtained, stretched and then heat-treated in the same manner as in Example 1, except that 0.2% by weight of the colored component 1 was kneaded into the PET resin shown in Example 1 using a biaxial extruder and that the multi-layer laminating apparatus was not used. Although the thus obtained film was slightly colored in blue, there was perceived no change in the color tone on the film surface. However, the heat ray-shielding performance of the film was extremely low. These results are shown in Table 1.

Comparative Example 2

A 1,202-layer multilayer film was obtained in the same manner as in Example 1, except that the thermoplastic resins A and B containing no colored component were used. The thus obtained multilayer film had a main reflection bandwidth in a wavelength range of 800 to 1,400 nm and a third-order reflection bandwidth in a wavelength range of 300 to 470 nm. This multilayer film had a high and wide reflection bandwidth in the near-infrared region. However, as compared to the multilayer film of Example 1, the transmittance in a wavelength range of 600 to 800 nm was high and the heat ray-reflecting performance was slightly inferior. Further, a difference in the color tone between a light transmitted at an angle of 12° and a light transmitted at an angle of 45° was observed. These results are shown in Table 1.

Comparative Example 3

A multilayer film was obtained in the same manner as in Comparative Example 2, except that the film thickness was adjusted such that the multilayer film had a reflection bandwidth in a wavelength range of 700 to 1,200 nm. The thus obtained multilayer film had a main reflection bandwidth in a wavelength range of 700 to 1,200 nm, but did not have any reflection bandwidth in a wavelength range of 400 to 700 nm. In a wavelength range of 600 to 800 nm, this multilayer film had a transmittance almost the same as that of the multilayer film of Example 4. However, prominent differences in the color tone between a light transmitted at an angle of 12° and a light transmitted at an angle of 45° were observed. These results are shown in Table 1.

Comparative Example 4

A 601-layer multilayer film was obtained in the same manner as in Example 13, except that the thermoplastic resins A and B containing no colored component were used. The thus obtained multilayer film had a main reflection bandwidth in a wavelength range of 800 to 1,200 nm, but did not have any reflection bandwidth in a wavelength range of 400 to 800 nm. Although this multilayer film had a relatively small difference in the color tone between a light transmitted at an angle of 12° and a light transmitted at an angle of 45°, its heat ray-shielding performance was poor These results are shown in Table 1.

Comparative Example 5

Using the multi-layer laminating apparatus of Example 1, a 601-layer multilayer film having a reflection bandwidth in a wavelength range of 800 to 1,200 nm and a 601-layer multilayer film having a reflection bandwidth in a wavelength range of 310 to 450 nm were obtained. These two multilayer films were dry-laminated in the same manner as in Example 1 to prepare a multilayer film having 1,202 layers. The thus obtained multilayer film had main reflection bandwidths in wavelength ranges of 310 to 450 nm and 800 to 1,200 nm, but did not have any reflection bandwidth in a wavelength range of 450 to 800 nm. This multilayer film was observed to have prominent differences in the color tone between a light transmitted at an angle of 12° and a light transmitted at an angle of 45°. These results are shown in Table 1.

TABLE 1

| | | Example 1 | Example 2 | Example 3 | Example 4 | Example 5 | Example 6 | Example 7 |
|---|---|---|---|---|---|---|---|---|
| Thermoplastic resin | A | PET | PET | PET | PET | PET | PET | PET |
| | B | SPG-copolymerized PET + colored component 1 | SPG-copolymerized PET + colored component 1 | CHDM-copolymerized PET + colored component 1 | SPG-copolymerized PET + colored component 1 | SPG-copolymerized PET + colored component 1 | SPG-copolymerized PET | SPG-copolymerized PET |
| Number of layers | B' | — | — | — | — | — | — | — |
| | Total number of layers | 1,201 | 801 | 1,201 | 1,202 | 1,202 | 1,202 | 1,202 |
| | Component Ln | 1,201 | 801 | 1,201 | 1,202 | 1,202 | 1,202 | 1,202 |
| | Component Lv | — | — | — | — | — | — | — |
| Colored layer | | — | — | — | — | — | colored component 1 | colored component 2 |
| Number of layer pairs whose sum of optical thicknesses is 400 to 650 nm | — | 827 | 556 | 827 | 1,198 | 1,198 | 828 | 828 |
| Number of layer pairs whose sum of optical thicknesses is 600 to 700 nm | — | 312 | 204 | 312 | 3 | 3 | 312 | 312 |
| Average reflectance (400 to 450 nm) | % | 57 | 46 | 52 | 15 | 15 | 57 | 57 |
| Average reflectance (400 to 700 nm) | % | 22 | 18 | 20 | 13 | 13 | 22 | 22 |
| Average reflectance (900 to 1,200 nm) | % | 93 | 72 | 81 | 96 | 96 | 93 | 93 |
| Average reflectance (1,200 to 1,400 nm) | % | 70 | 53 | 61 | 18 | 18 | 70 | 70 |
| Bandwidth (reflectance = 30% or higher) | nm | 310 to 477 | 400 to 469 | 400 to 472 | — | — | 400 to 477 | 400 to 477 |
| Bandwidth (reflectance = 50% or higher) | nm | 400 to 453 | 400 to 439 | 400 to 443 | — | — | 400 to 453 | 400 to 453 |
| Bandwidth (transmittance = 80% or lower) | nm | 400 to 495 587 to 800 | 400 to 484 587 to 800 | 400 to 486 587 to 800 | 587 to 800 | 591 to 800 | 400 to 491 586 to 800 | 400 to 501 |
| Bandwidth (reflectance = 50% or lower) | nm | 400 to 475 630 to 800 | 400 to 468 630 to 800 | 400 to 470 630 to 800 | 630 to 800 | 660 to 800 | 400 to 474 630 to 800 | 400 to 485 |
| Bandwidth (transmittance = 30% or lower) | nm | 673 to 800 | 673 to 800 | 673 to 800 | 673 to 800 | — | 673 to 800 | 400 to 482 |
| Maximum reflectance (500 to 700 nm) | % | 12 | 12 | 12 | 12 | 12 | 10 | 10 |
| Δa* | — | 5 | 4 | 4 | 2 | 2 | 5 | 1 |
| Δb* | — | 9 | 8 | 9 | 1 | 1 | 9 | 4 |
| C* | — | 18 | 16 | 17 | 14 | 7 | 18 | 55 |
| Maximum value of (Max. reflectance−Min. reflectance) in continuous 100 nm bandwidth in a wavelength range of 400 to 700 nm | % | 5 | 5 | 5 | 5 | 5 | 5 | 5 |

TABLE 1-continued

| | | Example 8 | Example 9 | Example 10 | Example 11 | Example 12 | Example 13 | Example 14 |
|---|---|---|---|---|---|---|---|---|
| Solar reflectance | % | 43 | 37 | 40 | 35 | 35 | 43 | 43 |
| Solar transmittance | % | 42 | 48 | 45 | 50 | 53 | 43 | 51 |
| Visible light transmittance | % | 81 | 83 | 82 | 85 | 87 | 82 | 85 |
| Internal haze | % | 0.4 | 0.3 | 0.4 | 0.4 | 0.3 | 0.2 | 0.2 |
| Heat shrinkage (150° C.) | % | 0.8 | 0.7 | 0.7 | 0.8 | 0.8 | 0.8 | 0.8 |
| 5% stress (140° C.) | MPa | 11 | 13 | 13 | 11 | 11 | 11 | 11 |
| Thermoplastic resin A | | PET | PET | PET | PET | PET + colored component 1 | PET | PET |
| B | | SPG-copolymerized PET + colored component 3 | SPG-copolymerized PET | SPG-copolymerized PET + colored component 1 CHDM-copolymerized PET | SPG-copolymerized PET + colored component 1 SPG-copolymerized PET | SPG-copolymerized PET | SPG-copolymerized PET + colored component 4 | SPG-copolymerized PET + colored component 4 |
| B' | | — | colored component 1 colored component 2 | — | — | — | — | — |
| Number of layers Total number of layers | | 1,202 | 1,202 | 2,004 | 1,803 | 1,201 | 601 | 601 |
| Component Ln | | 1,202 | 1,202 | 1,202 | 1,202 | 1,201 | 601 | 601 |
| Component Lv | | — | — | 1,202 | 601 | — | — | — |
| Colored layer A | | — | — | — | — | — | — | — |
| B | | — | 828 | 1,630 | 1,429 | 827 | 597 | 597 |
| Number of layer pairs whose sum of optical thicknesses is 400 to 650 nm | | 312 | 312 | 312 | 312 | 312 | 3 | 3 |
| Number of layer pairs whose sum of optical thicknesses is 600 to 700 nm | | 57 | 57 | 67 | 64 | 57 | 21 | 21 |
| Average reflectance (400 to 450 nm) | % | 22 | 22 | 36 | 34 | 22 | 12 | 12 |
| Average reflectance (400 to 700 nm) | % | 93 | 93 | 93 | 93 | 92 | 83 | 83 |
| Average reflectance (900 to 1,200 nm) | % | 70 | 70 | 70 | 70 | 70 | 19 | 19 |
| Average reflectance (1,200 to 1,400 nm) | % | | | | | | | |
| Bandwidth (reflectance = 30% or higher) | nm | 400 to 477 | 400 to 477 | 400 to 501 | 400 to 491 | 400 to 477 | 400 to 412 | 400 to 412 |
| Bandwidth (reflectance = 50% or higher) | nm | 400 to 453 | 400 to 453 | 400 to 474 | 400 to 471 | 400 to 453 | — | — |
| Maximum reflectance (500 to 700 nm) | % | 12 | 10 | 31 | 28 | 12 | 12 | 12 |
| Bandwidth (transmittance = 80% or lower) | nm | 400 to 491 534 to 774 | 400 to 502 586 to 800 | 400 to 487 586 to 800 | 400 to 478 586 to 800 | 400 to 491 586 to 800 | 400 to 482 | 400 to 511 |
| Bandwidth (transmittance = 50% or lower) | nm | 400 to 475 601 to 732 | 400 to 487 630 to 800 | 400 to 472 630 to 800 | 400 to 469 630 to 800 | 400 to 475 630 to 800 | 400 to 410 | 400 to 473 |

TABLE 1-continued

|  |  | Example 15 | Example 16 | Example 17 | Example 18 | Example 19 | Example 20 | Example 21 |
|---|---|---|---|---|---|---|---|---|
| Bandwidth (transmittance = 30% or lower) | nm | — | 400 to 482 673 to 800 | 400 to 441 671 to 800 | 400 to 440 671 to 800 | 673 to 800 | — | 400 to 414 |
| Δa* | — | 7 | 5 | 7 | 9 | 5 | 2 | 2 |
| Δb* | — | 8 | 9 | 10 | 10 | 9 | 1 | 1 |
| C* | — | 24 | 18 | 25 | 27 | 18 | 9 | 32 |
| Maximum value of (Max. reflectance-Min. reflectance) in continuous 100 nm bandwidth in a wavelength range of 400 to 700 nm | % | 5 | 5 | 8 | 8 | 5 | 5 | 5 |
| Solar reflectance | % | 43 | 43 | 52 | 52 | 43 | 30 | 30 |
| Solar transmittance | % | 45 | 40 | 37 | 37 | 42 | 66 | 64 |
| Visible light transmittance | % | 65 | 80 | 68 | 70 | 80 | 88 | 86 |
| Internal haze | % | 1.8 | 0.4 | 0.4 | 0.4 | 4 | 0.6 | 0.6 |
| Heat shrinkage (150° C.) | % | 0.8 | 0.8 | 0.8 | 0.8 | 0.8 | 0.8 | 0.8 |
| 5% stress (140° C.) | MPa | 11 | 11 | 11 | 11 | 11 | 11 | 11 |

|  |  | Example 15 | Example 16 | Example 17 | Example 18 | Example 19 | Example 20 | Example 21 |
|---|---|---|---|---|---|---|---|---|
| Thermoplastic resin | A | PET | PET | PET | PET | PET | PET | PET |
|  | B | SPG-copolymerized PET + colored component 5 | SPG-copolymerized PET + colored component 5 | SPG-copolymerized PET + colored component 5 | SPG-copolymerized PET + colored component 4 + colored component 5 | SPG-copolymerized PET + colored component 4 + colored component 5 | SPG-copolymerized PET + colored component 4 + colored component 5 | SPG-copolymerized PET + colored component 6 |
|  | B' | — | — | — | — | — | — | — |
| Number of layers | Total number of layers | 601 | 601 | 601 | 1,201 | 1,201 | 801 | 601 |
|  | Component Ln | 601 | 601 | 601 | 1,201 | 1,201 | 801 | 601 |
|  | Component Lv | — | — | — | — | — | — | — |
| Colored layer | A | — | — | — | — | — | — | — |
|  | B | 597 | 597 | 597 | 827 | 827 | 556 | 597 |
| Number of layer pairs whose sum of optical thicknesses is 400 to 650 nm | — | 3 | 3 | 3 | 312 | 312 | 204 | 3 |
| Number of layer pairs whose sum of optical thicknesses is 600 to 700 nm | — | — | — | — | — | — | — | — |
| Average reflectance (400 to 450 nm) | % | 21 | 21 | 21 | 18 | 29 | 15 | 21 |
| Average reflectance (400 to 700 nm) | % | 12 | 12 | 12 | 11 | 12 | 11 | 12 |
| Average reflectance (900 to 1,200 nm) | % | 83 | 83 | 83 | 93 | 93 | 72 | 83 |
| Average reflectance (1,200 to 1,400 nm) | % | 19 | 19 | 19 | 70 | 70 | 53 | 19 |
| Bandwidth (reflectance = 30% or higher) | nm | 400 to 412 | 400 to 412 | 400 to 412 | — | — | — | — |

TABLE 1-continued

| | | Comparative Example 1 | Comparative Example 2 | Comparative Example 3 | Comparative Example 4 | Comparative Example 5 |
|---|---|---|---|---|---|---|
| Bandwidth (reflectance = 50% or higher) | nm | — | — | — | — | — |
| Maximum reflectance (500 to 700 nm) | % | 12 | 12 | 12 | 12 | 12 |
| Bandwidth (transmittance = 80% or lower) | nm | 400 to 418<br>665 to 778 | 400 to 508<br>655 to 778 | 400 to 508<br>653 to 776 | 400 to 491<br>652 to 778 | 400 to 507<br>651 to 775 | 400 to 453<br>610 to 800 |
| Bandwidth (transmittance = 50% or lower) | nm | — | 400 to 478 | 400 to 483 | 400 to 420 | 400 to 485 | 400 to 432<br>741 to 783 |
| Bandwidth (transmittance = 30% or lower) | nm | — | — | — | — | — | 400 to 406 |
| Δa* | — | 2 | 2 | 2 | 3 | 2 | 3 |
| Δb* | — | 1 | 1 | 1 | 5 | 1 | 2 |
| C* | — | 2 | 21 | 23 | 18 | 21 | 12 |
| Maximum value of (Max. reflectance-Min. reflectance) in continuous 100 nm bandwidth in a wavelength range of 400 to 700 nm | — | 5 | 5 | 5 | 5 | 5 | 5 |
| Solar reflectance | % | 30 | 30 | 39 | 40 | 36 | 31 |
| Solar transmittance | % | 65 | 57 | 38 | 41 | 44 | 52 |
| Visible light transmittance | % | 86 | 83 | 82 | 83 | 84 | 85 |
| Internal haze | % | 0.4 | 0.6 | 0.7 | 0.7 | 0.7 | 0.3 |
| Heat shrinkage (150° C.) | % | 0.8 | 0.8 | 0.8 | 0.8 | 0.7 | 0.8 |
| 5% stress (140° C.) | MPa | 11 | 11 | 11 | 11 | 13 | 11 |

| | | Comparative Example 1 | Comparative Example 2 | Comparative Example 3 | Comparative Example 4 | Comparative Example 5 |
|---|---|---|---|---|---|---|
| Thermoplastic resin | A | PET + colored component 1 | PET | PET | PET | PET |
| | B | — | SPG-copolymerized PET | SPG-copolymerized PET | SPG-copolymerized PET | SPG-copolymerized PET |
| | B' | — | — | — | — | — |
| Number of layers | Total number of layers | 1 | 1,201 | 1,201 | 601 | 1,202 |
| | Component Ln | — | 1,201 | 1,201 | 601 | 601 |
| | Component Lv | — | — | — | — | 291 |
| Colored layer | A | 1 | — | — | — | — |
| | B | 0 | 827 | 964 | 597 | 1,198 |
| Number of layer pairs whose sum of optical thicknesses is 400 to 650 nm | — | 12 | 312 | 31 | 3 | 3 |
| Number of layer pairs whose sum of optical thicknesses is 600 to 700 nm | — | 12 | 57 | 15 | 21 | 74 |
| Average reflectance (400 to 450 nm) | % | 12 | 22 | 16 | 12 | 33 |
| Average reflectance (400 to 700 nm) | % | 12 | 93 | 93 | 83 | 82 |
| Average reflectance (900 to 1,200 nm) | % | — | — | — | — | — |
| Average reflectance (1,200 to 1,400 nm) | % | 12 | 70 | 12 | 17 | 14 |

TABLE 1-continued

| | | | | | | |
|---|---|---|---|---|---|---|
| Bandwidth (reflectance = 30% or higher) | nm | — | 400 to 477 | 681 to 800 | 400 to 412 | 400 to 496 |
| Bandwidth (reflectance = 50% or higher) | nm | — | 400 to 448 | 699 to 800 | — | 400 to 493 |
| Maximum reflectance (500 to 700 nm) | % | 12 | 12 | 50 | 12 | 12 |
| Bandwidth (transmittance = 80% or lower) | nm | 586 to 800 | 400 to 463 | 673 to 800 | 400 to 418 | 400 to 522 |
| Bandwidth (transmittance = 50% or lower) | nm | 638 to 800 | 400 to 445 | 701 to 800 | — | 400 to 496 |
| Bandwidth (transmittance = 30% or lower) | nm | 690 to 800 | — | 713 to 800 | — | 400 to 486 |
| Δa* | — | 1 | 8 | 21 | 2 | 11 |
| Δb* | — | 1 | 15 | 5 | 1 | 42 |
| C* | — | 25 | 16 | 2 | 2 | 60 |
| Maximum value of (Max. reflectance-Min. reflectance) in continuous 100 nm bandwidth in a wavelength range of 400 to 700 nm | % | 1 | 5 | 5 | 5 | 5 |
| Solar reflectance | % | 11 | 43 | 40 | 30 | 34 |
| Solar transmittance | % | 69 | 57 | 55 | 69 | 66 |
| Visible light transmittance | % | 83 | 86 | 86 | 88 | 81 |
| Internal haze | % | 8 | 0.2 | 0.2 | 0.2 | 0.2 |
| Heat shrinkage (150° C.) | % | 0.9 | 0.8 | 0.8 | 0.8 | 0.8 |
| 5% stress (140° C.) | MPa | 15 | 11 | 11 | 11 | 11 |

INDUSTRIAL APPLICABILITY

We provide a heat ray-shielding film which is capable of shielding heat rays coming from sunlight and the like. More specifically, we provide a heat ray-shielding film which shows a small change in the angle-dependent color tone and is capable of shielding heat rays at a high efficiency. The heat ray-shielding film can thus be suitably used in window glass applications of automobiles, trains, buildings and the like.

The invention claimed is:

1. A multilayer film comprising 50 or more layers of each of two or more thermoplastic resins having different optical properties are alternately laminated with each other,
wherein
said multilayer film comprises at least one layer containing a colored component whose average transmittance in a wavelength range of 400 to 450 nm or 600 to 800 nm is lower than that in 450 to 600 nm;
average reflectance in a wavelength range of 900 to 1,200 nm is 70% or higher;
average reflectance in a wavelength range of 1,200 to 1,400 nm is 30% or higher;
both of differences between a* values (Δa*) and between b* values (Δb*), respectively, of the transmitted light of white light incoming at an incident angle of 12° and of transmitted light of white light incoming at an incident angle of 45° are 10 or less; and
said multilayer film has 1) a maximum reflectance in a wavelength range of 600 to 700 nm is 15% or lower, 2) a solar reflectance of 30% or higher, and the visible light transmittance is 70% or higher, and 3) a transmittance of 80% or lower at a wavelength of 400 to 450 nm, or said multilayer film comprises a bandwidth of not less than 50 nm where transmittance is 80% or lower in a wavelength range of 600 to 800 nm.

2. The multilayer film according to claim 1, comprising the 50 or more layers of each of two or more thermoplastic resins having different optical properties are alternately laminated with each other,
wherein
a sum of optical thicknesses of adjacent layers is 400 to 650 nm for more than half of said layers; and
said multilayer film comprises at least one layer which contains a colored component whose average transmittance in a wavelength range of 400 to 450 nm or 600 to 800 nm is lower than that in a wavelength range of 450 to 600 nm.

3. The multilayer film according to claim 1, comprising a reflection bandwidth of not smaller than 50 nm where the reflectance is 30% or higher in the wavelength range of 400 to 800 nm.

4. The multilayer film according to claim 1, wherein average reflectance in a wavelength range of 1,200 to 1,400 nm is 30% or higher and average reflectance in a wavelength range of 400 to 450 nm, which is measured from at least one side of said film, is 30% or lower.

5. The multilayer film according to claim 4, further comprising:
not less than 10 pairs of adjacent layers whose sum of optical thicknesses is 600 to 700 nm; and
at least one layer which contains a colored component whose average transmittance in a wavelength range of 400 to 450 nm is lower than that in a wavelength range of 450 to 600 nm.

6. The multilayer film according to claim 1, wherein at least one of said thermoplastic resins contains a colored component; and said thermoplastic resin containing said colored component is a noncrystalline resin.

7. The multilayer film according to claim 1, having an internal haze of 3% or less.

8. The multilayer film according to claim 7, wherein a colored layer A is arranged on one side of a multilayer film comprising 50 or more layers of each of two or more thermoplastic resins having different optical properties are alternately laminated with each other, wherein average reflectance in a wavelength range of 900 to 1,200 nm is 70% or higher; both of differences between a* values (Δa*) and between b* values (Δb*), respectively, of the transmitted light of white light incoming at an incident angle of 12° and of transmitted light of white light incoming at an incident angle of 45° are 10 or less; said multilayer film comprises a bandwidth of not less than 50 nm where transmittance is 80% or lower in a wavelength range of 400 to 800 nm; and a colored layer B is arranged on the other side; and absorption rates (Abs(W)) of said colored layers A and B at a wavelength (W) satisfy Equations 1 and 2:

$$Abs A(450) < Abs B(450) \quad (1)$$

$$Abs A(700) > Abs B(700) \quad (2).$$

9. The multilayer film according to claim 1, wherein a colored component contained therein has a melting point of 300° C. or lower.

10. A multilayer film comprising a colored layer on at least one side of the multilayer film according to claim 1.

11. The multilayer film according to claim 1, having a solar reflectance of 30% or higher.

12. The multilayer film according to claim 1, having an average reflectance of 15% to less than 40% in a wavelength range of 400 to 700 nm.

13. The multilayer film according to claim 1, having a difference of less than 10% between the maximum reflectance and the minimum reflectance in a continuous 100-nm bandwidth within a wavelength range of 400 to 700 nm.

14. The multilayer film according to claim 1, comprising:
a component (Ln) in which two or more thermoplastic resins having different optical properties that reflect light having a wavelength of 900 to 1,400 nm are alternately laminated; and
a component (Lv) in which two or more thermoplastic resins having different optical properties that reflect light having a wavelength of 400 to 700 nm are alternately laminated,
wherein the number of thermoplastic resin layers in said component (Ln) is greater than the number of thermoplastic resin layers in said component (Lv).

15. The multilayer film according to claim 1, comprising:
at least one component (Ln) which reflects light having a wavelength of 900 to 1,400 nm; and
at least one component (Lv) which reflects light having a wavelength of 400 to 700 nm,
wherein the difference in the in-plane average refractive indices of said layers constituting said component (Ln) is greater by 0.01 or more than that of said layers constituting said component (Lv).

16. The multilayer film according to claim 1, having a heat shrinkage of ±1% or less when heated at 140° C. for 30 minutes.

17. The multilayer film according to claim 1, having a stress when elongated by 5% at 140° C. of 10 MPa or less.

18. A window glass for automobiles, comprising the multilayer film according to claim 1.

* * * * *

UNITED STATES PATENT AND TRADEMARK OFFICE
CERTIFICATE OF CORRECTION

| | | |
|---|---|---|
| PATENT NO. | : 9,452,590 B2 | Page 1 of 1 |
| APPLICATION NO. | : 14/124031 | |
| DATED | : September 27, 2016 | |
| INVENTOR(S) | : Uto et al. | |

It is certified that error appears in the above-identified patent and that said Letters Patent is hereby corrected as shown below:

In the Specification

In Column 36
At Line 50, please delete "or shorter".

Signed and Sealed this
Second Day of May, 2017

Michelle K. Lee
*Director of the United States Patent and Trademark Office*